US012438299B2

(12) United States Patent
Lee et al.

(10) Patent No.: US 12,438,299 B2
(45) Date of Patent: Oct. 7, 2025

(54) PIN ARRAY ASSEMBLY AND CONNECTOR FOR HIGH-SPEED SIGNAL TRANSMISSION USING THE SAME

(71) Applicant: WITHWAVE, Suwon-si (KR)

(72) Inventors: Soo Joo Lee, Hwaseong-si (KR); Jeong Il Jeon, Seoul (KR); Sung Jin Kim, Yongin-si (KR); Yong Goo Lee, Seongnam-si (KR); Jeong Nam Cheon, Seoul (KR); Young Kun Kwon, Hwaseong-si (KR); Bum Hee Bae, Yongin-si (KR); Youn Ho Kim, Seoul (KR); Jong Wan Shim, Seongnam-si (KR); Seong Soo Han, Suwon-si (KR)

(73) Assignee: WITHWAVE, Suwon-si (KR)

( * ) Notice: Subject to any disclaimer, the term of this patent is extended or adjusted under 35 U.S.C. 154(b) by 400 days.

(21) Appl. No.: 17/974,380

(22) Filed: Oct. 26, 2022

(65) Prior Publication Data

US 2023/0146943 A1 May 11, 2023

(30) Foreign Application Priority Data

Nov. 11, 2021 (KR) ........................ 10-2021-0154469

(51) Int. Cl.
*H01R 13/11* (2006.01)
*H01R 43/16* (2006.01)

(52) U.S. Cl.
CPC ........... *H01R 13/112* (2013.01); *H01R 43/16* (2013.01)

(58) Field of Classification Search
CPC ...... H01R 13/10; H01R 13/28; H01R 13/646; H01R 13/6473; H01R 12/50; H01R 12/51; H01R 12/52; H01R 12/55; H01R 12/57; H01R 12/72; H01R 43/16; H01R 4/4818; H01R 24/84
USPC ......................................... 439/842, 843, 845
See application file for complete search history.

(56) References Cited

U.S. PATENT DOCUMENTS

| | | | | |
|---|---|---|---|---|
| 7,429,176 | B2 * | 9/2008 | Johnescu | H01R 12/716 439/74 |
| 9,543,703 | B2 * | 1/2017 | Horchler | H01R 13/05 |
| 10,230,192 | B2 * | 3/2019 | Peloza | H01R 13/428 |
| 2006/0135003 | A1 * | 6/2006 | Peloza | H01R 13/04 439/843 |
| 2016/0315430 | A1 * | 10/2016 | Takeuchi | H01R 12/707 |
| 2022/0013941 | A1 | 1/2022 | Tanaka et al. | |

FOREIGN PATENT DOCUMENTS

| | | |
|---|---|---|
| JP | 2003-132992 | 5/2003 |
| KR | 20-0439284 | 4/2008 |
| KR | 10-2031505 | 10/2019 |
| KR | 10-2020-0130144 | 11/2020 |

* cited by examiner

*Primary Examiner* — Abdullah A Riyami
*Assistant Examiner* — Amara Anderson

(57) ABSTRACT

Proposed is a pin array assembly and a connector for high-speed signal transmission using the same and, more particularly, a connector technology in which high-speed signal transmission characteristics are guaranteed by implementing a pin array assembly with multiple pins whose pitches are precisely adjusted by insert injection and a connector capable of relieving stress caused by an external force while applying the pin array assembly.

19 Claims, 24 Drawing Sheets

PIN ARRAY ASSEMBLY AND CONNECTOR FOR HIGH-SPEED SIGNAL TRANSMISSION USING THE SAME

CROSS REFERENCE TO RELATED APPLICATION

The present application claims priority to Korean Patent Application No. 10-2021-0154469, filed Nov. 11, 2021, the entire contents of which is incorporated by reference herein for all purposes.

BACKGROUND OF THE INVENTION

Field of the Invention

The present disclosure relates to a pin array assembly and a connector for high-speed signal transmission using the same and, more particularly, to a connector technology in which high-speed signal transmission characteristics are guaranteed by implementing a pin array assembly with multiple pins whose pitches are precisely adjusted by insert injection and a connector capable of relieving stress caused by an external force while applying the pin array assembly.

Description of the Related Art

A board-to-board connector (BTB connector) is widely used to electrically connect circuit boards. When connectors are coupled, an electrical connection is made by matching between pins, enabling electrical signal transmission between a board and a board.

Recently, due to the demand for scalable computing, high-speed signal transmission connectors with high data rates of 28 Gbps, 56 Gbps, or 112 Gbps or more are required. In addition, with the miniaturization and slimming of the system applying the BTB connector, connectors with specifications such as high density, low profile, and low thermal resistance are required.

In order to meet these requirements, the number of connector pins increases, the pin pitch is further narrowed, the size of the pin becomes smaller, and the pin is getting thinner at the same time.

In particular, in order to ensure the reliability of a connector's high-speed signal transmission characteristics, stable and precise mounting of pins on a connector body is required.

Yet, as the pin pitch of the connector is further narrowed, it is difficult to precisely maintain the pitches when the pins are mounted on the connector body. In case the pin pitches of the connector are not uniform, the matching may be misaligned when coupling the connectors, and since proper matching is not achieved, the reliability of the connector for high-speed signal transmission is deteriorated.

Moreover, the smaller and thinner connector pins may be bent or deformed even by a weak external force and may be damaged by an external force above a certain level, and thus, there is a high risk of the pins being deformed or damaged when the pins are installed in the connector body.

When connectors are forcibly coupled in a state where the connector pins are not installed in the correct position or are bent and deformed, the pins themselves may be damaged.

In addition, for the high-speed signal transmission characteristics, the impedance of the connector pin needs to be precisely maintained at a level of less than a few ohms. A surface mount technology (SMT) for soldering is applied in mounting the connector on the board, and at this time, solder rise occurs in which the mounting material climbs up the connector pin, causing a problem to change the impedance of the connector pin.

Impedance change of the connector pin due to solder rise causes contact failure when connecting with the other connector.

Thus, it is necessary to remove the contamination of the pins by the mounting material after the pins are mounted, but there is a problem that such contamination is practically impossible to remove.

Due to the problem factors described above, the high-speed signal transmission characteristics are deteriorated, and when the board-to-board electrical connection is made through connectors, a malfunction of the entire system is caused.

Furthermore, external force may be applied to the connector due to various factors such as coupling with a counterpart connector, and as the external force applied to the connector is transferred to the pin as it is, it may affect a board contact area of the pin, causing damage to the board contact area or separation of the pin from the board.

Due to the damage to the board contact area, poor contact of the connector greatly impairs the reliability of high-speed signal transmission characteristics that require high data rates of 28 Gbps, 56 Gbps, or 112 Gbps or more.

In addition, external force above a certain level may affect the board itself, causing damage to sensitive electronic components mounted on the board.

DOCUMENTS OF RELATED ART (Patent Document 0001) Korean Patent No. 10-2031505
(Patent Document 0002) Korean Patent Application Publication No. 10-2020-0130144

SUMMARY OF THE INVENTION

Accordingly, the present disclosure has been made keeping in mind the above problems occurring in the related art, and the present disclosure is intended to provide a In order to achieve the above objective, according to an embodiment of the present disclosure, there is provided a connector that ensures reliability for high-speed signal transmission characteristics and mounting stability on a board.

Moreover, an objective of the present disclosure is to minimize the change in impedance that determines high-speed signal transmission characteristics due to imprecise pin pitch and solve the problem of mechanical mismatch when connecting connectors by solving the problem that it difficult to maintain precise connector pin pitch.

Furthermore, an objective of the present disclosure is to solve the problem that a connector pin is deformed or damaged when the pin is installed in a connector body as the pin bends or deforms even with a weak external force due to the reduced size and thickness of the pin.

In addition, an objective of the present disclosure is to solve the problem of change in impedance of a connector pin and a contact defect with a counterpart pin as a mounting material such as solder or a solder ball rides up the pin when mounting pins on a connector.

Particularly, an objective of the present disclosure is to solve the problem that a malfunction of the entire system occurs when a board-to-board electrical connection is made through connectors that require high-speed signal transmission characteristics due to the problem factors occurring in mounting the pins on the connector.

In addition, an objective of the present disclosure is to solve the problem that as the external force applied to the connector is transferred to the pin as it is due to various factors such as coupling with a counterpart connector, it affects a board contact area of the pin, causing damage to the board contact area or separation of the pin from the board.

Furthermore, an objective of the present disclosure is to solve the problem that the external force above a certain level is transferred to the board through the pins of the connector, causing damage to sensitive electronic components mounted on the board.

The objectives of the present disclosure are not limited to the above, and other objectives and advantages of the present disclosure not mentioned may be understood by the following description.

In order to achieve the above objective, according to an embodiment of the present disclosure, there is provided a pin array assembly, including: a pin array in which a plurality of pins, each including a body area in which a through hole is famed, are arranged to be spaced apart; a lower support in which a lower end of the pin array is insert-molded and sealed, and configured to support the lower end of the pin array while maintaining a set pitch of the pin array; and an upper support in which a middle portion of the pin array is insert-molded and sealed, and configured to support the middle portion of the pin array while maintaining the set pitch of the pin array.

As an example, a pin of the plurality of pins may include: a head area provided with a curved portion that is bent to protrude in one direction and matches a pin of a mating connector; a tail area whose end is mounted; and a body area configured to connect the head area and the tail area and have a through hole formed in a center thereof so as to be deformable in a width direction, wherein a portion of the head area, a portion of the body area, or portions of the head area and the body area may be insert-molded in the upper support and supported, and a portion of the body area, a portion of the tail area, or portions of the body area and the tail area may be insert-molded in the lower support and supported.

At this time, the tail area of pin may include: a mounting portion recessed into a semicircle or polygon at an end thereof.

In an embodiment, the tail area of pin may include: a mounting portion formed in a bending shape bent in a lateral direction at an end thereof.

As an example, the pin array may have a directionality to be coupled with pins of a mating connector, wherein a directional groove may be formed at one end of the lower support to correspond to the directionality.

In addition, a connector for high-speed signal transmission of an embodiment according to the present disclosure includes: the pin array assembly; a base mold mounted and fixed on a board and in which the lower support is inserted and supported so that an end of the pin is mounted and fixed to the board; and a top mold in which the upper support is inserted and supported.

When the connector is mounted on the board, the rise of a mounting material along the pin may be primarily prevented by the lower support and may be secondarily prevented by the upper support.

Furthermore, the connector for high-speed signal transmission may further include: a fastening means configured to support a relative movement of the top mold with respect to the base mold, and to assemble the top mold on top of the base mold, wherein an end contact portion of the pin mounted on the board via the base mold may be fixed and maintained, and when an external force is applied, the body area of the pin may be bent and deformed according to the relative movement of the top mold with respect to the base mold via the fastening means.

The fastening means may include: an assembly fastening part formed to protrude in a vertical direction from a side of one of the base mold and the top mold; and an assembly insertion part formed to be wider than a cross-sectional length of the assembly fastening part on a side of a remaining one, so that the assembly fastening part is inserted and fastened, wherein the base mold and the top mold may be assembled by a fastening of the assembly fastening part and the assembly insertion part, and when the external force is applied, the assembly fastening part may be moved in a cross-sectional length direction in the assembly insertion part, so that the relative movement of the top mold is made.

As an example, the top mold may include: a top body frame; a plurality of main partition walls provided to be spaced apart in a longitudinal direction inside the top body frame; a plurality of sub partition walls spaced apart in the longitudinal direction inside the top body frame and provided between the main partition walls; and a mounting slot provided by the main partition walls and the sub partition walls and into which the upper support of the pin array assembly is inserted and mounted.

The top mold may further include: a pin seating space provided in the main partition wall so that the head area of the pin of the pin array assembly is inserted and seated.

Furthermore, the pin seating space may be provided on each side of the main partition wall.

The pin seating space may have one side open so that a left-right movement of the head area of the pin is restricted while a front-rear movement is possible.

As an example, the base mold may include: a base body frame; a base bottom surface formed on a lower part of the base body frame; a plurality of mounting partition walls spaced apart in a longitudinal direction inside the base body frame and provided on an upper surface of the base bottom surface; and a mounting groove provided between the mounting partition walls and into which the lower support of the pin array assembly is inserted and mounted.

The base mold may further include: a mounting hole formed as a through hole in the base bottom surface, and in which a solder ball is seated in a downward direction and the end of the pin of the pin array assembly is inserted and mounted in an upward direction.

In the mounting hole, a mounting part of the pin array assembly may be inserted and mounted in the upward direction, a portion of an upper part of the solder ball may be joined in the downward direction to fill a part of a cross section thereof, and an air passage may be formed at a remaining part of the cross section.

Furthermore, the connector for high-speed signal transmission may further include: a cavity formed as a space in which the body area of the pin is positioned between the lower support mounted on the base mold and the upper support mounted in the top mold.

As an example, the connector may be a hermaphroditic connector in which the pin of the pin array assembly is capable of selectively performing a function of a receptacle or a plug.

As another example, the connector may be a receptacle connector or a plug connector in which the pin of the pin array assembly performs either a function of a receptacle or a plug.

According to the present disclosure, it is possible to provide a connector that can guarantee reliability for high-speed signal transmission characteristics.

In particular, since pitches of connector pins can be maintained precisely by supporting a pin array with an upper support and a lower support using insert injection molding method, it is possible to solve the problem of mismatching due to pin pitch error when coupling connectors, and to ensure reliability and stability for high-speed signal transmission characteristics.

In addition, in the case of high-speed signal transmission connectors with high data rates of 28 Gbps, 56 Gbps, or 112 Gbps or higher for application to scalable computing, etc., a connector pin is easily bent or deformed even by a weak external force due to the reduced size and thickness of the pin, leading to a problem of pins being deformed or damaged when the pins are mounted on a connector body. This problem can be solved by means of a pin array assembly.

Furthermore, since the rise of the mounting material on the pin is primarily prevented by the lower support and secondarily by the upper support by applying the insert injection molding method to seal the lower portion and the middle portion of the pin array, it is possible to solve the problem of impedance change of the connector pin and a contact defect with a counterpart pin due to the mounting material riding up the pin.

In particular, it is possible to solve the problem that high-speed signal transmission characteristics are deteriorated due to various problem factors that occur in mounting individual pins on the connector body, and that malfunction of the entire system is caused due to poor electrical connection.

The effects of the present disclosure are not limited to those mentioned above, and other effects not mentioned will be clearly understood by those skilled in the art from this specification and accompanying drawings.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1A:
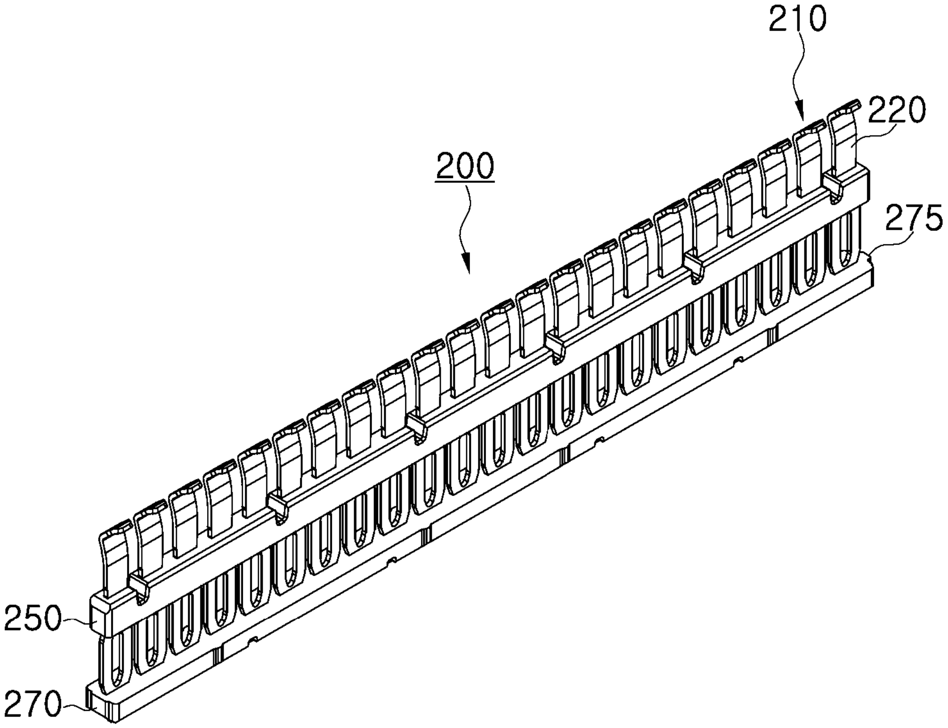
FIGS. 1A and 1B are perspective views of an embodiment of a pin array assembly according to the present disclosure.

Hereinafter, embodiments of the present disclosure will be described in detail with reference to the accompanying drawings. However, the present disclosure is not limited by the embodiments.

In order to explain the present disclosure, the operational advantages of the present disclosure, and the objectives achieved by the practice of the present disclosure, the embodiments of the present disclosure are exemplified below and will be described with reference thereto.

First, the terms used in this application are only used to describe specific embodiments, and are not intended to limit the present disclosure, and a singular expression may include a plural expression unless the context clearly indicates otherwise. In addition, it should be understood that in the present disclosure, terms such as "comprise" or "have" are intended to designate that a feature, number, step, operation, component, part, or combination thereof described in the specification exists, and do not preclude the possibility of addition or existence of one or more other features or numbers, steps, operations, components, parts, or combinations thereof.

In describing the present disclosure, when it is determined that a detailed description of a related known configuration or function may obscure the gist of the present disclosure, the detailed description thereof will be omitted.

The present disclosure proposes a pin array assembly and a connector for high-speed signal transmission using the same and, more particularly, a connector technology in which high-speed signal transmission characteristics are guaranteed by implementing a pin array assembly with multiple pins whose pitches are precisely adjusted by insert injection and a connector capable of relieving stress caused by an external force as the pin array assembly is applied.

In the case of high-speed signal transmission connectors to support scalable computing, etc., in order to meet various requirements, the number of connector pins increases, the pin pitch is further narrowed, the size of the pin becomes smaller, and the pin is getting thinner at the same time.

In particular, in order to secure stability and reliability for high-speed signal transmission characteristics, the pitch between adjacent pins of a pin array must be precisely maintained. However, if each pin is individually mounted on a connector body, it is not possible to precisely maintain the pitch between the pins and pitch error occurs.

In addition, due to the reduced size and thickness, the pins are deformed or damaged even by a weak external force, so it is very difficult to stably mount the pins to the connector body.

Due to the pitch error and the defamation or damage of the pins upon installation, etc., the precise matching between pin arrays when coupled with a counterpart connector is not made, which causes problems in high-speed signal transmission.

Accordingly, in the present disclosure, a pin array assembly is presented as a way to easily mount a pin array on a connector body while precisely adjusting and maintaining the pin pitch, as well as a high-speed signal transmission connector structure for easy application of the pin array assembly according to the present disclosure.

Furthermore, external force may be applied to the connector due to various factors such as coupling with the counterpart connector, and as the external force applied to the connector is transferred to the pin as it is, it may affect a board contact area of the pin, causing damage to the board contact area or separation of the pin from the board. In particular, a certain level of external force transferred to the board affects sensitive electronic components mounted on the board.

Therefore, the present disclosure presents the high-speed signal transmission connector structure in which a base mold and a top mold of a connector are separated, so that when an external force is applied, the contact portion of the pin mounted on the board via the base mold is stably fixed while the body of the pin is deformed to a certain level according to the relative movement of the top mold, thereby relieving the stress caused by the external force.

Figure 1B:
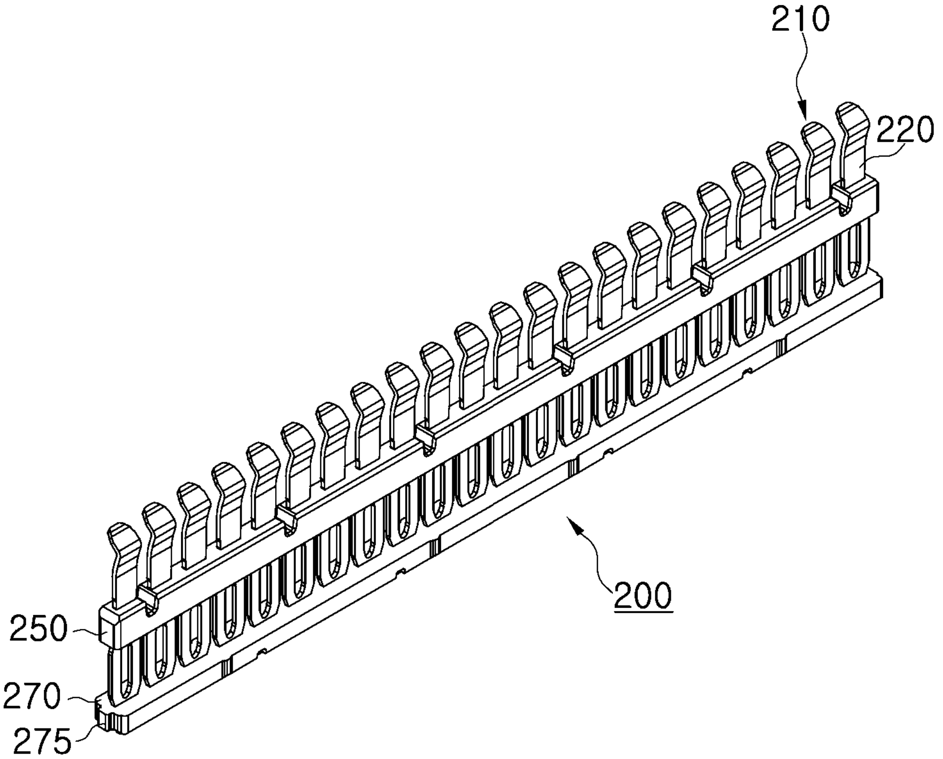

FIGS. 1A and 1B show an embodiment of a pin array assembly according to the present disclosure. FIG. 1A is a perspective view of the pin array assembly 200 viewed from the front, and FIG. 1B is a perspective view of the pin array assembly 200 viewed from the rear.

The pin array assembly 200 may include a pin array 210, an upper support 250, and a lower support 270.

In the pin array 210, a plurality of pins 220 may be arranged to be spaced apart from each other in a lateral direction.

The upper support 250 may maintain a uniform pitch between the pins 220 arranged in the pin array 210 while supporting the middle portion of the pin array 210. The lower support 270 may maintain a constant pitch between the pins 220 arranged in the pin array 210 while supporting the lower end of the pin array 210.

In particular, the upper support 250 may be provided so that the middle portion of the pin array 210 is insert-molded and sealed while the lower support 270 may be provided so that the lower end of the pin array 210 is insert-molded and sealed.

That is, in the pin array assembly 200 according to the present disclosure, the upper support 250 and the lower support 270 may be formed using injection molding by inserting the pin array 210 so that the pitches between the plurality of pins 220 arranged in the pin array 210 can be precisely adjusted and maintained.

The pin array assembly 200 may have a directionality according to the shape of the pins 220 of the pin array 210. As an example, depending on the shape of a head area of the pin 220, the pin array assembly 200 may have a directionality to be seated on a connector body.

A directional protrusion 275 may be provided at one end of the lower support 270 to correspond to the directionality of the pin array assembly 200, and the pin array assembly 200 may be mounted on the connector body according to the directional protrusion 275.

The pin 220 constituting the pin array 210 will be described in more detail with reference to examples.

Figure 2A:
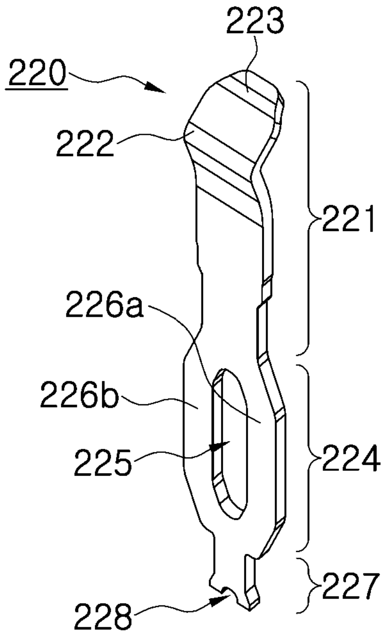
FIGS. 2A and 2B are perspective views of an example of a pin of the pin array assembly according to the present disclosure.
Figure 2B:
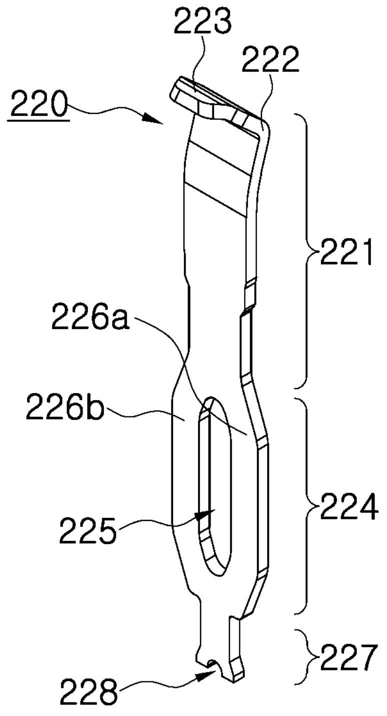

FIGS. 2A and 2B are perspective views of an example of a pin of the pin array assembly according to the present disclosure.

The pin 220 may include a head area 221, a body area 224, and a tail area 227.

The head area 221 of the pin 220 may include: a curved portion 222 bent to protrude in one direction to match a pin of a counterpart connector; and a stub 223 with the end bent in the other direction.

Due to the shape of the head area 221 of the pin 220, the pin array assembly 200 in which the pins 220 are arranged has directionality.

Since the head area 221 of the pin 220 has an S-shaped double contact structure when the connector is coupled with a mating connector, the reliability of contact with a mating pin may be further improved.

Figure 3A:
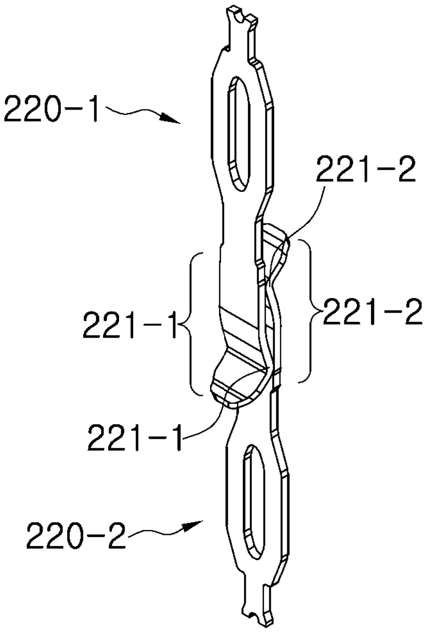
FIGS. 3A and 3B show a double contact structure of the pin according to the present disclosure when mated with a mating connector.
Figure 3B:
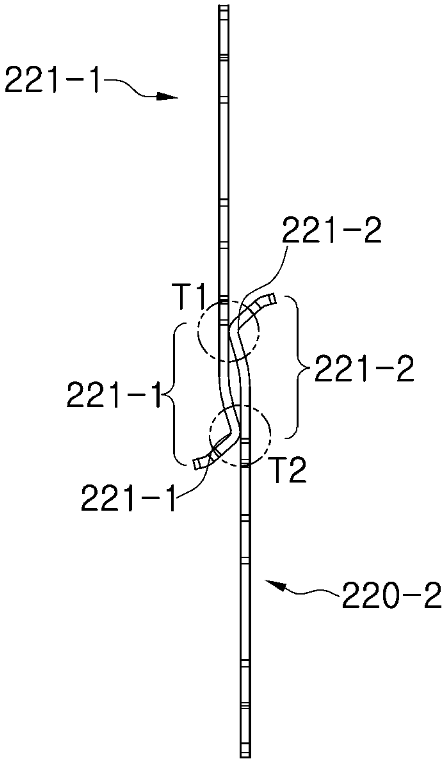

In this regard, referring to a double contact structure of the pin according to the present disclosure when coupled with the mating connector shown in FIGS. 3A and 3B, when two connectors are matched to each other, as head areas 221-1 and 221-2 of mutually coupled pins 220-1 and 220-2 go all the way to the ends of the mating pins' head areas 221-1 and 221-2, they are in contact with each other by the elastic force of the curved portions 222-1 and 222-2, so that the double contact point T1, T2 structure may be formed.

Due to this double contact structure, it is possible to secure the reliability and stability of high-speed signal transmission characteristics.

The pin 220 will be continuously described with reference to FIGS. 2A and 2B again.

The body area 224 of the pin 220 connects the head area 221 and the tail area 227, and may include a through hole 225 formed in the center thereof.

Since the pin 220 is thin, bending deformation is easy to some extent in the thickness direction, but it is not easy to bend and deform in the width direction because it has a certain level of width. In order to maintain a certain level of impedance that determines the contact area and high-speed signal transmission characteristics with the corresponding pin when coupled with the mating connector, it is not possible to reduce the width below a certain level. Due to this functional problem, bending deformation in the width direction of the pin 220 is impossible.

However, in the present disclosure, the through hole 225 is formed in the body area 224 of the pin 220 so that deformation in the width direction is possible in the body area 224.

By forming the through hole 225 in the center of the body area 224, the body area 224 may be divided into two pin body bars 226*a* and 226*b* by the through hole 225, and since the width of the pin body bars 226*a* and 226*b* may be reduced to a certain level by adjusting the size of the through hole 225, deformation in the width direction may be made possible in the body area 224 although deformation in the width direction is impossible in the head area 221 and the tail area 227 of the pin.

That is, the pin 220 applied to the present disclosure has a thickness capable of bending deformation at a certain level in the front-rear direction by an external force, and bending deformation is also possible even in the width direction, which is the left-right direction due to the structure having the through hole 225 formed in the body area 224 of the pin.

In this way, by enabling defamation in the width direction in the body area 224 of the pin 220, the pin 220 is deformed to a certain level in the width direction when the connector is coupled with the mating connector to support alignment between the connectors, and stress may be relieved through bending deformation when an external force is applied.

The tail area 227 of the pin 220 may have an end portion 228 mounted on the connector body. In the embodiment of the connector according to the present disclosure to be described later, the end portion 228 of the tail area 227 of the pin 220 may be mounted on a board via the base mold. To be specific, the end portion 228 of the tail area 227 is inserted into a mounting groove of the base mold and may be mounted on the board using solder.

The end portion 228 of the tail area 227 of the pin 220 may be formed in an inwardly recessed semicircular shape. By forming the end portion 228 of the tail area 227 in the semicircular shape, a contact area with the solder is increased to maintain a strong and stable mounting.

Moreover, the tail area of the pin may be detailed into various shapes to ensure that the mounting remains stable. In this regard, FIGS. 4A and 4B are perspective views of another example of the pin of the pin array assembly according to the present disclosure.

Figure 4A:
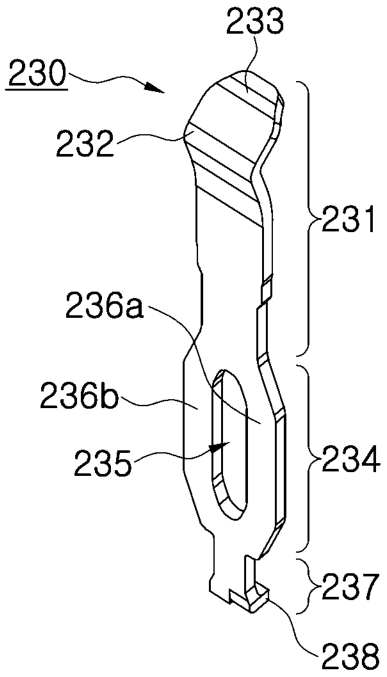
FIGS. 4A and 4B are perspective views of another example of the pin of the pin array assembly according to the present disclosure.
Figure 4B:
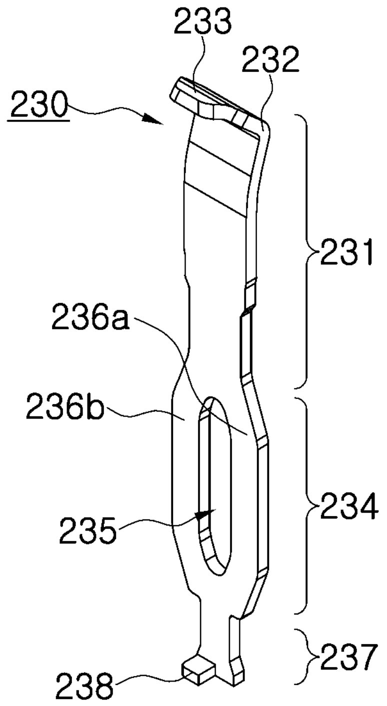

Since a head area 231 and a body area 234 of a pin 230 shown in FIGS. 4A and 4B are similar to the head area 221 and the body area 224 of the pin 220 presented in the embodiment of FIGS. 2A and 2B described above, a description thereof will be omitted.

An end portion 238 of a tail area 237 of the pin 230 may be formed in a bending shape in which a portion is bent to one side. By forming the end portion 238 of the tail area 237 in a curved bending shape, a contact area with the solder is increased to maintain a strong and stable mounting.

The pin array assembly 200 according to the present disclosure as described above is configured such that the upper support 250 for supporting the pin array 210 is provided while the middle portion of the pin array 210 is insert-molded and sealed, and the lower support 270 for supporting the pin array 210 is provided while the lower end of the pin array 210 is insert-molded and sealed. A process of manufacturing such pin array assembly 200 will be described with reference to an example.

Figure 5A:
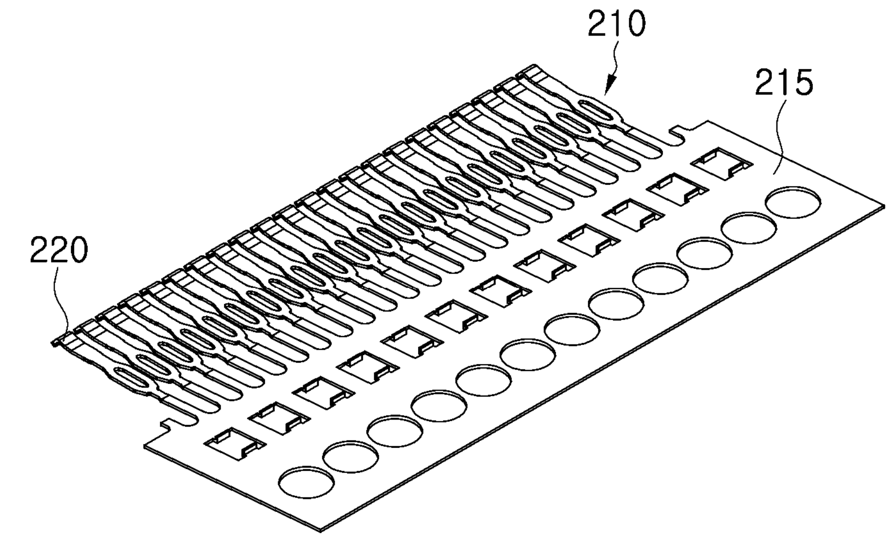
FIGS. 5A to 5C show an example of manufacturing process of the pin array assembly according to the present disclosure.
Figure 5B:
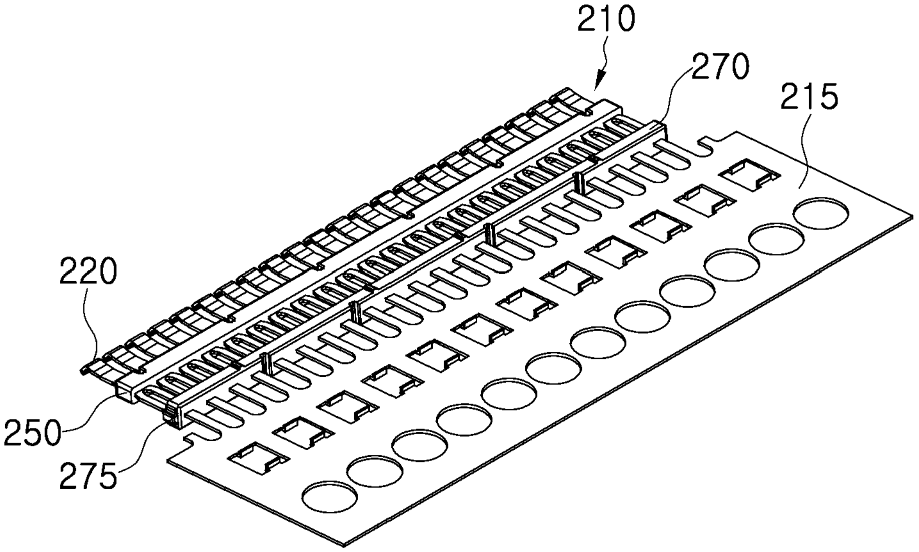
Figure 5C:
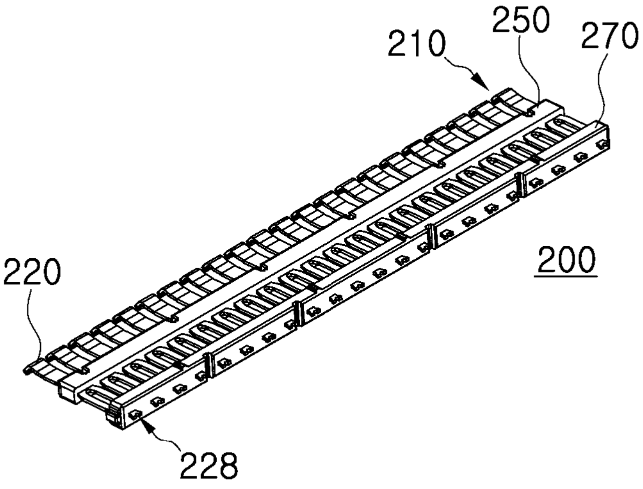

FIGS. 5A to 5C show an example of manufacturing process of the pin array assembly according to the present disclosure.

As shown in FIG. 5A, the pin array 210 supported by a carrier 215 is manufactured by presswork so that the pitches of the pins 220 are adjusted by means of the carrier 215 so as to maintain the arrangement.

As shown in FIG. 5B, the middle portion of the pin array 210 supported by a carrier 215 is inserted to produce the upper support 250 by injection molding whereas the lower end of the pin array 210 is inserted to produce the lower support 270 by injection molding.

Since the pin array 210 is inserted to produce the upper support 250 and the lower support 270 by a molding method in a state in which the pitches between the pins 220 are maintained by the carrier 215, the pitch of the pin array 210 may be maintained in a precisely adjusted state.

The carrier supporting the lower portion of the pin array 210 that is insert-molded in the upper support 250 and the lower support 270 is removed as shown in FIG. 5C.

The lower end of the pin array 210 from which the carrier 215 is removed may be properly machined, by processing the end portion 228 of each of the pins 220 arranged in the pin array 210 into a semicircular shape or a curved bending shape, it is possible to increase the contact area of the solder to achieve a strong and stable mounting as described above.

In an embodiment, when manufacturing the pin array 210 supported by the carrier 215 as shown in FIG. 5A, a circular through hole may be formed in the connection portion between the end of the pin array 210 and the carrier 215 by presswork, and when the carrier 215 supporting the pin array 210 is removed as shown in FIG. 5C, a semicircular mounting portion may be formed at the end portion 228 of the pin array 210 by cutting the middle of the through hole.

Through this manufacturing process, the pin array assembly 200 according to the present disclosure may be produced.

In the above-described embodiment of the pin array assembly according to the present disclosure, the pin array assembly is described to be applied to a connector that is a hermaphroditic connector in which the pins of the pin array assembly are capable of selectively performing a function of a receptacle or a plug. However, the present disclosure is not limited thereto, and the pins of the pin array assembly may be configured as receptacle pins and applied to a receptacle connector or may be configured as plug pins and applied to a plug connector.

For example, the head area of the pin may be formed in the form of a receptacle to accommodate the mating pin or the head area of the pin may be formed in the form of a plug to accommodate in the other pin.

In addition, the present disclosure presents a connector for high-speed signal transmission capable of relieving stress caused by an external force as the pin array assembly according to the present disclosure is applied. Hereinafter, the connector for high-speed signal transmission according to the present disclosure will be described with reference to an embodiment.

Figure 6:
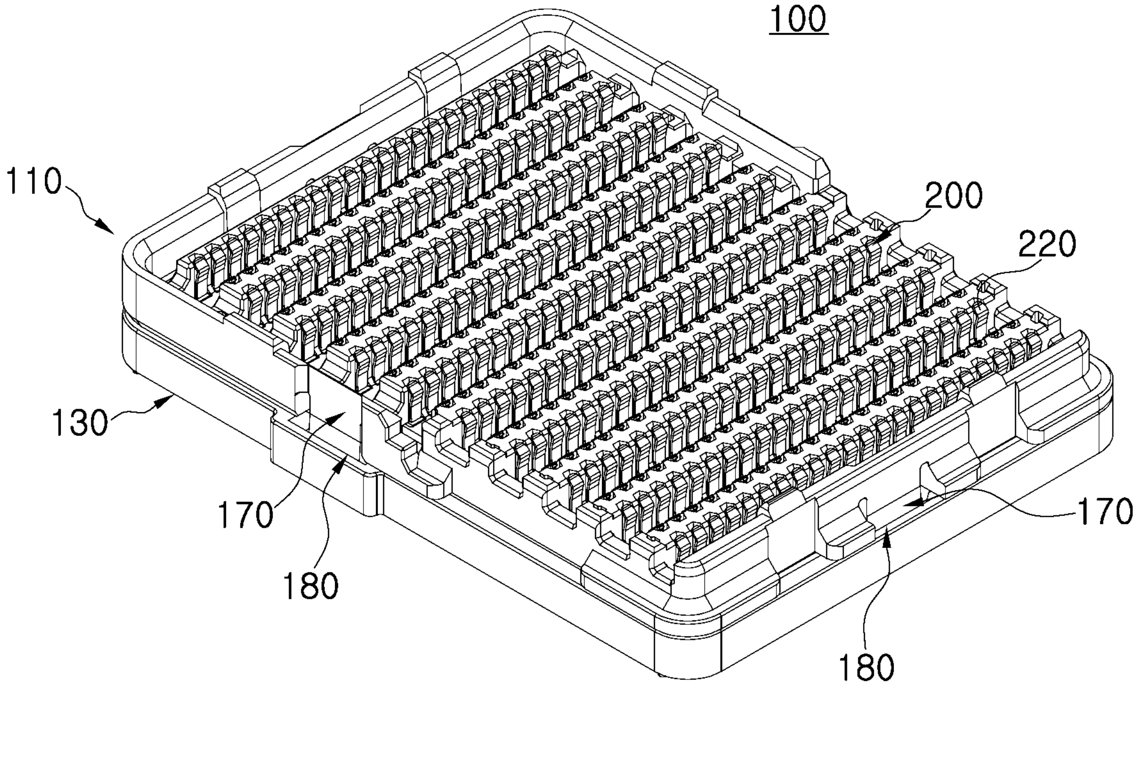
FIG. 6 is a perspective view of an embodiment of a connector for high-speed signal transmission according to the present disclosure.
Figure 7:
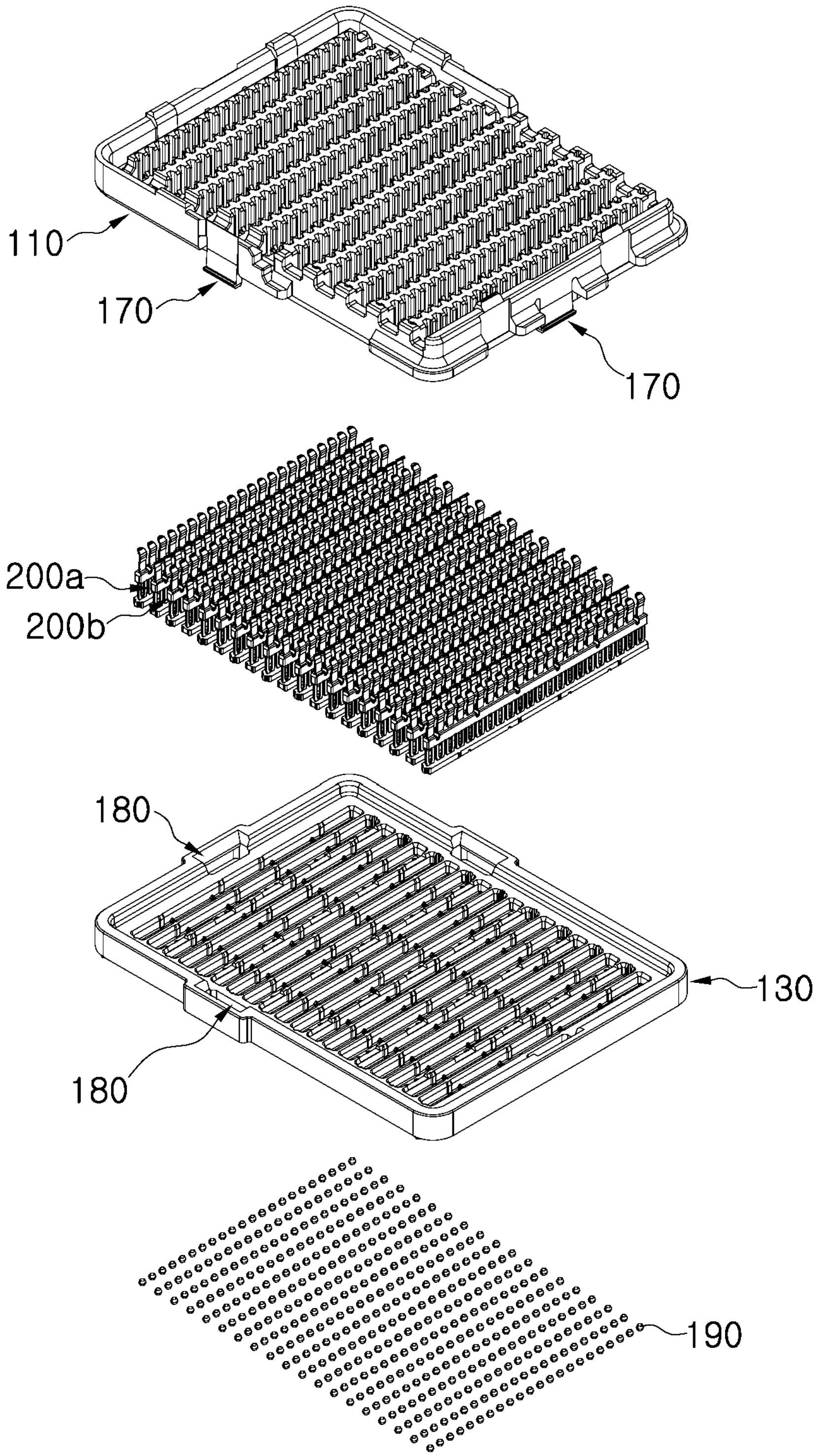
FIG. 7 is an exploded perspective view viewed from the upper side of the embodiment of the connector for high-speed signal transmission according to the present disclosure.
Figure 8:
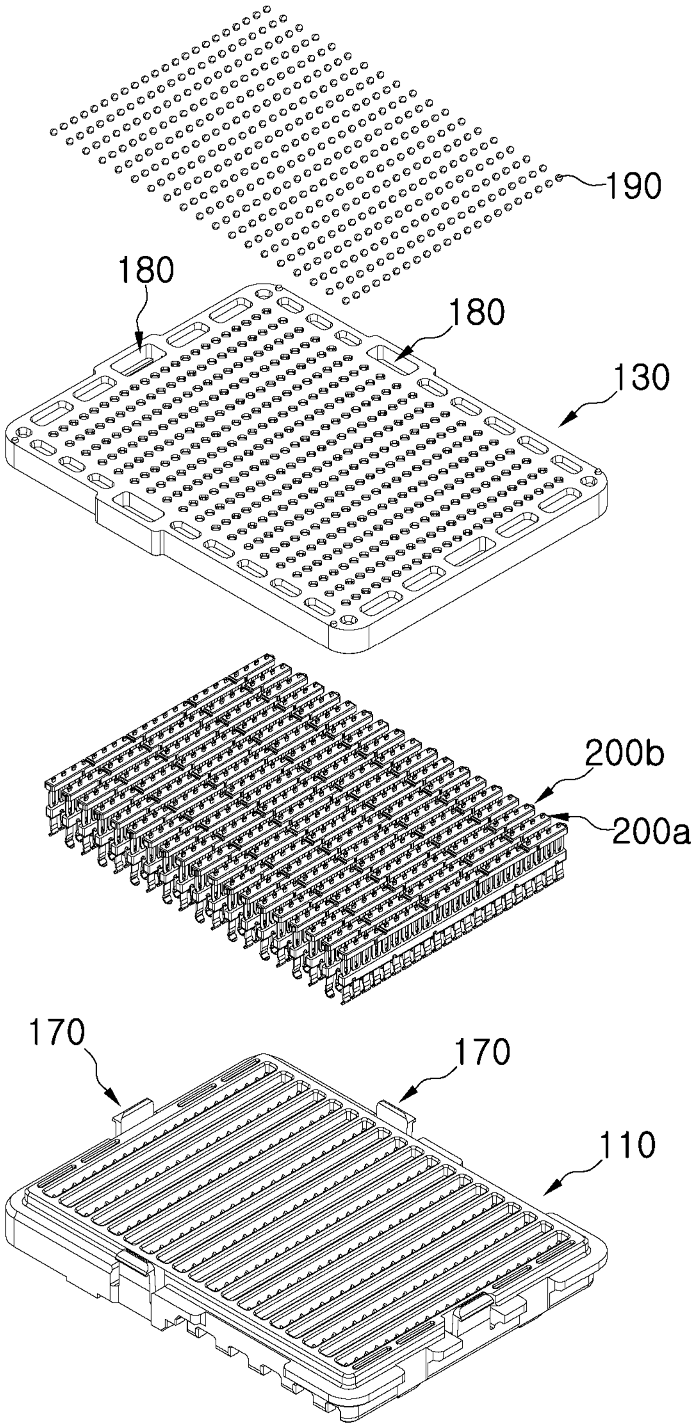
FIG. 8 is an exploded perspective view viewed from the lower side of the embodiment of the connector for high-speed signal transmission according to the present disclosure.

FIG. 6 is a perspective view of an embodiment of a connector for high-speed signal transmission according to the present disclosure, FIG. 7 is an exploded perspective view viewed from the upper side of the embodiment of the connector for high-speed signal transmission according to the present disclosure, and FIG. 8 is an exploded perspective view viewed from the lower side of the embodiment of the connector for high-speed signal transmission according to the present disclosure.

The connector 100 according to the present disclosure may include a top mold 110, a base mold 130, and the pin array assembly 200.

The body of the connector 100 may be configured by being separated into the top mold 110 at an upper side and the base mold 130 at a lower side. The top mold 110 and the base mold 130 may be assembled to correspond to each other via the fastening means including an assembly fastening part 170 and an assembly insertion part 180. The top mold 110 may be assembled on the upper part of the base mold 130 by inserting and fastening the assembly fastening part 170 of the top mold 110 into the assembly insertion part 180 provided in the base mold 130.

When an external force is applied while the connector 100 is mounted on a board, the fastening means may support the top mold 110 to move relative to the base mold 130 according to the external force while maintaining a fixed state mounted on the board.

A plurality of pin array assemblies **200*a* and 200*b* may be arranged and seated on the base mold 130 in a longitudinal direction, and the top mold 110 may be seated thereon and assembled. At this time, the pin array assembly according to the present disclosure described above may be applied as the pin array assembly 200**.

The pin array assembly 200 may be mounted on the base mold 130 by using a solder ball 190 bonding method. Ends of the plurality of pin array assemblies **200*a* and 200*b* arranged in the longitudinal direction may be mounted on the base mold 130 by using a ball grid array (BGA) method, and the connector 100 may be seated on and fixed to a board (not shown) by solder balls 190 on a lower surface of the base mold 130**.

Here, the solder ball bonding method for seating the connector 100 on the board is one example, and various bonding methods may be applied. As an example of another bonding method, the connector 100 may be implemented in a state in which the pin array assembly 200 is mounted on the base mold 130 and the top mold 110 without applying a solder ball, or in the process of mounting the connector 100 on the board, the end of the pin may be mounted on the board using a mounting material such as solder paste.

The connector 100 according to the present disclosure has a structure in which the top mold 110 and the base mold 130 are separated, and thus, while the end contact portion of the pin 220 mounted on the board via the base mold 130 is maintained in a fixed state, the body area of the pin 220 is bent and deformed according to the relative movement of the top mold 110 by an external force, so that the stress caused by the applied external force may be relieved.

Each configuration of the connector 100 according to the present disclosure will be described with reference to examples.

Figure 9:
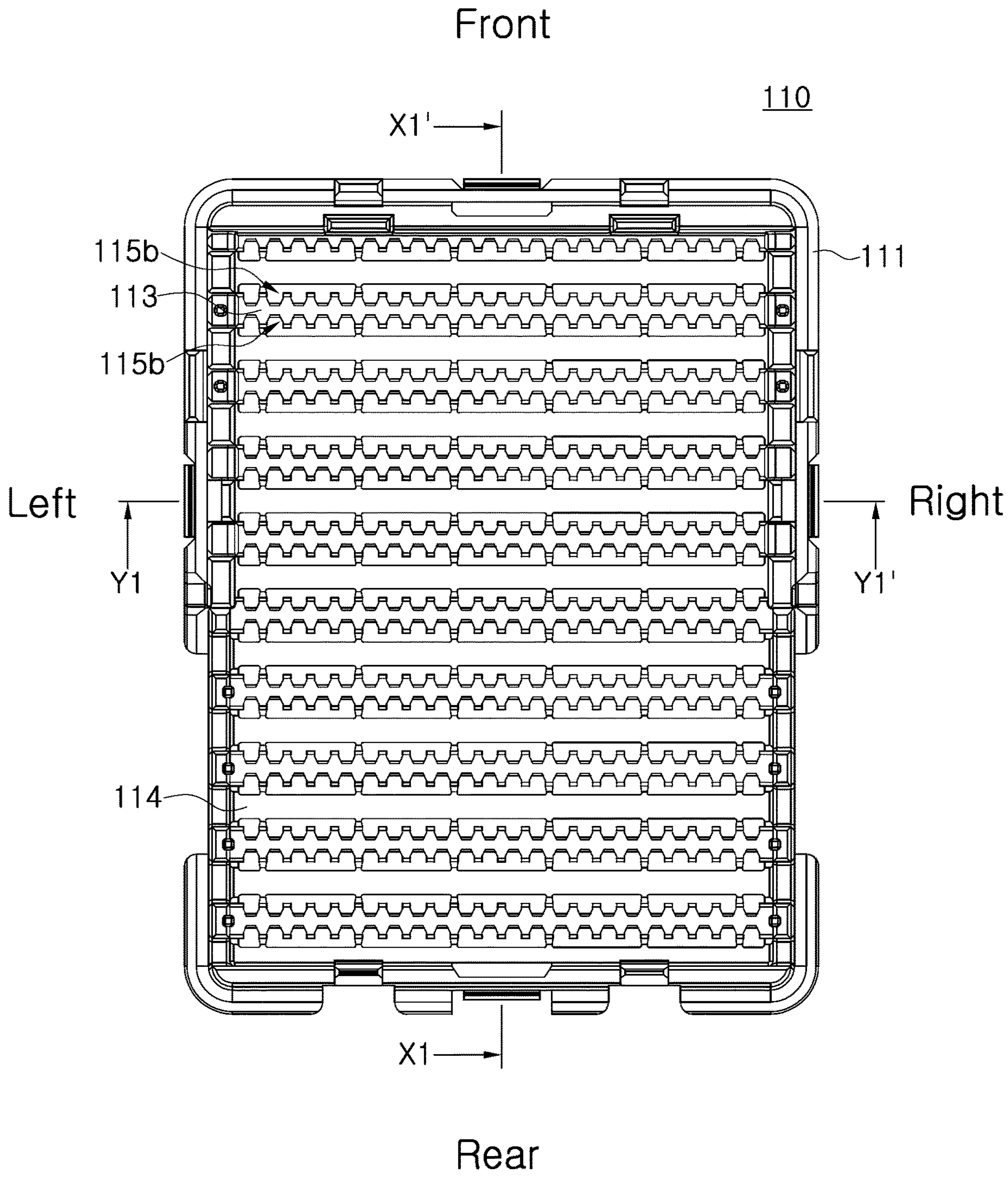
FIG. 9 is a plan view of an example of a top mold in the connector for high-speed signal transmission according to the present disclosure.
Figure 10A:
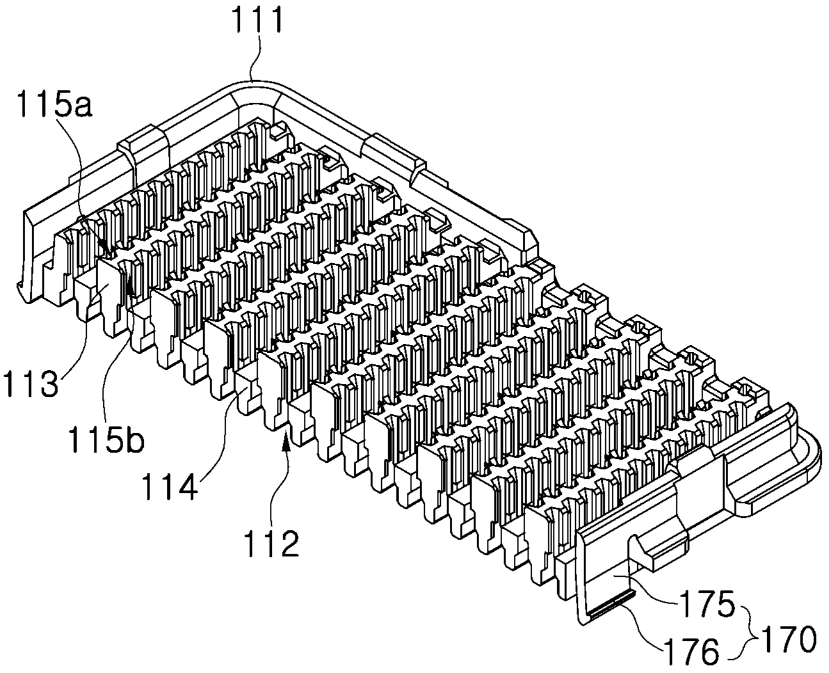
FIGS. 10A and 10B are cut-away views of the example of the top mold of FIG. 9.
Figure 10B:
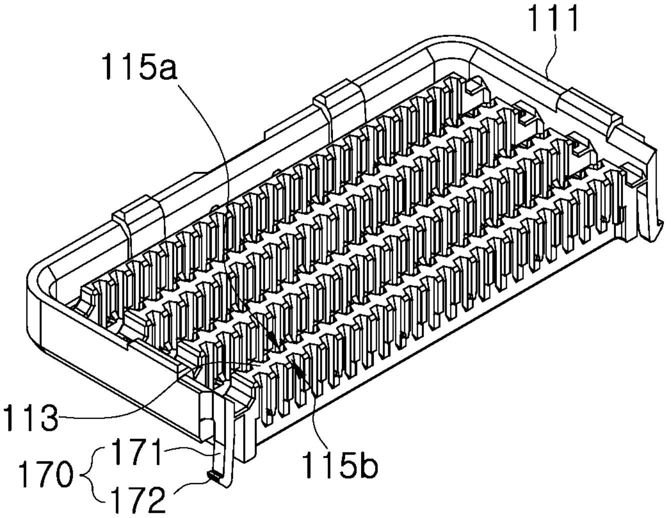

FIG. 9 is a plan view of an example of a top mold in the connector for high-speed signal transmission according to the present disclosure, FIG. 10A is 10B is a cut-away view of the example of FIG. 9 taken along the X1-X1' direction, and FIG. 10B is a cut-away view of the example of FIG. 9 taken along the Y1-Y1' direction.

The top mold 110 may include a top body frame 111, and a plurality of main partition walls 113 and a plurality of sub partition walls 114 spaced apart in the longitudinal direction inside the top body frame 111.

A mounting slot 112 into which a middle portion of the pin array assembly 200 is able to be inserted may be provided in a space between the main partition wall 113 and the sub partition wall 114.

Pin seating spaces **115*a* and 115*b* in which the head areas of respective pins arranged in the transverse direction of the pin array assembly 200 are inserted and seated may be provided on each side surface of the main partition wall 113, respectively. Each of the pin seating spaces 115*a* and 115*b* may be provided as a space larger than the pin head area by a certain level so that the pin head area may be moved within a certain range. Each of the pin seating spaces 115*a* and 115*b*** may be formed as a slot-shaped space with one side open so that the movement in the left-right direction of the pin head area is restricted while the movement in the front-rear direction is possible.

The plurality of pin array assemblies **200*a* and 200*b* may be inserted and mounted on the mounting slots 112 provided by the main partition walls 113 and the sub partition walls 114 in the longitudinal direction. The upper support of the pin array assembly 200 may be inserted and mounted in the mounting slot 112 of the top mold 110**.

The pin array assembly 200 has a directionality, and the plurality of pin array assemblies **200*a* and 200*b* may be alternately mounted in the mounting slots 112** while changing the insertion direction according to the directionality.

The assembly fastening part 170 may be provided at the middle portions of the left side and the right side of the top body frame 111 of the top mold 110. The assembly fastening part 170 may include: a fastening support leg 171 formed by protruding vertically downward from the middle portions of the left side and the right side of the top body frame 111; and a fastening protrusion 172 protruding outward from the end of the fastening support leg 171.

The assembly fastening part 170 may also be provided at the middle portions of the upper side and the lower side of the top body frame 111 of the top mold 110. Similarly, the assembly fastening part 170 may include: a fastening support leg 175 formed by protruding vertically downward from the middle portions of the upper side and the lower side of the top body frame 111; and a fastening protrusion 176 protruding outward from the end of the fastening support leg 175. Although in this embodiment, it has been illustrated and described that the assembly fastening part 170 is provided on each of the left side, the right side, the upper side, and the lower side of the top mold 110, depending on the situation, the arrangement number, arrangement position, shape, etc. of the assembly fastening part 170 may be selectively and variously modified.

Figure 11:
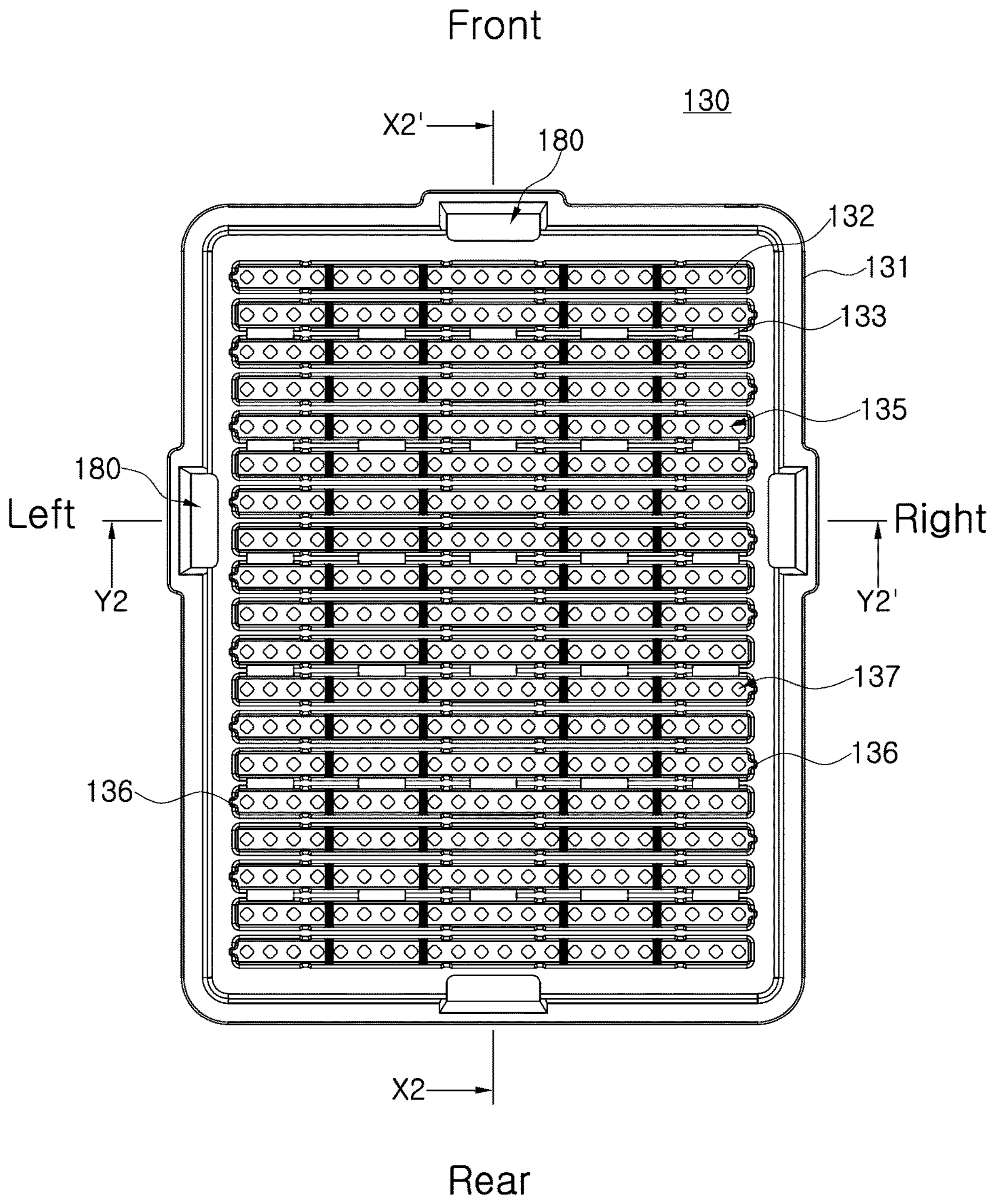
FIG. 11 is a plan view of an example of a base mold in the connector for high-speed signal transmission according to the present disclosure.
Figure 12A:
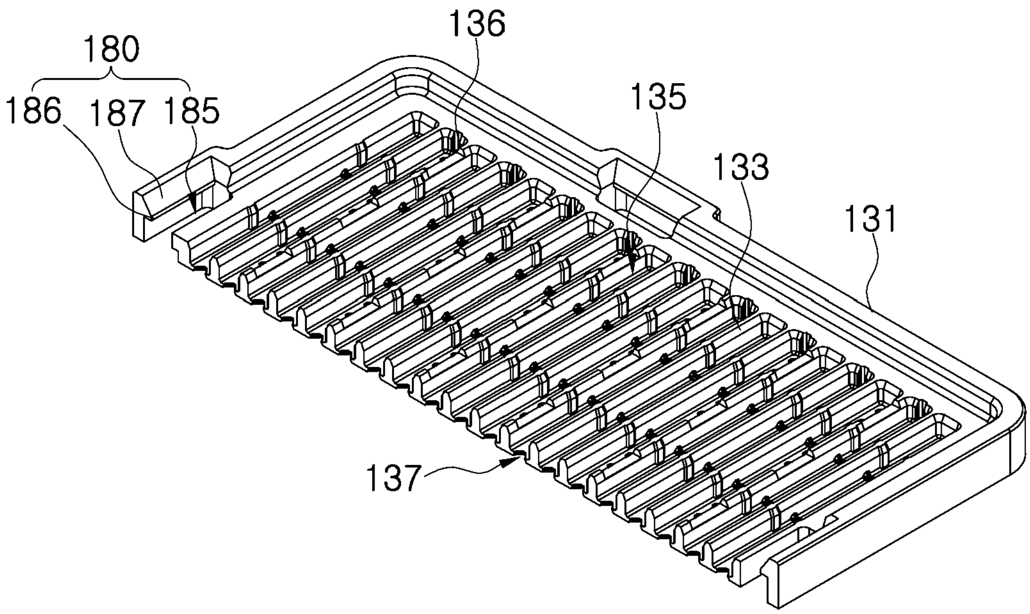
FIGS. 12A and 12B are cut-away views of the example of the base mold of FIG. 11.
Figure 12B:
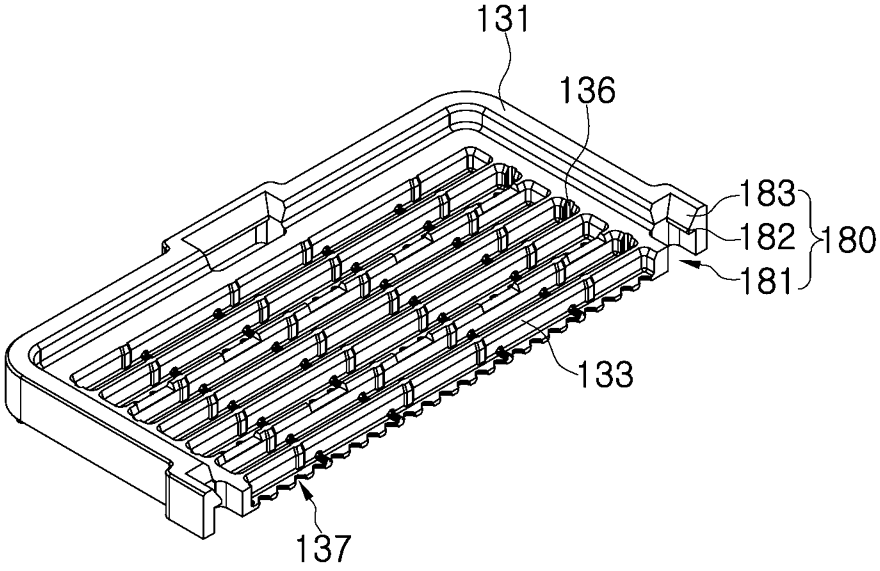

FIG. 11 is a plan view of an example of a base mold in the connector for high-speed signal transmission according to the present disclosure, FIG. 12A is a cut-away view of the example of FIG. 11 taken along the X2-X2' direction, and FIG. 12B is a cut-away view of the example of FIG. 11 taken along the Y2-Y2' direction.

The base mold 130 may include a base body frame 131, a base bottom surface 132, and a mounting partition wall 133.

The mounting partition walls 133 are provided inside the base body frame 131 and spaced apart along the longitudinal direction, and a mounting groove 135 into which an end portion of the pin array assembly 200 is able to be inserted and mounted may be provided in a space between the mounting partition walls 133.

A plurality of mounting grooves 135 may be provided along the longitudinal direction by the plurality of mounting partition walls 133 provided to be spaced apart along the longitudinal direction.

The plurality of pin array assemblies **200*a* and 200*b* may be inserted and mounted in the mounting grooves 135 provided between the mounting partition walls 133 along the longitudinal direction, and the lower support of the pin array assembly 200 may be inserted and mounted in the mounting groove 135 of the base mold 130**.

In addition, as previously described, the pin array assembly 200 has a directionality, and the plurality of pin array assemblies **200*a* and 200*b* may be alternately mounted in the mounting grooves 135 of the base mold 130 while changing the insertion direction according to the directionality. In order to make it easier to distinguish the mounting direction, a directional groove 136 may be famed at one end of the mounting groove 135 so that a directional protrusion formed on one side of the lower support of the pin array assembly 200** may be matched and inserted.

On the base bottom surface 132, mounting holes 137, in which solder balls 190 are seated on the lower surface thereof and the end portions of the pins of the pin array assembly 200 are inserted and mounted on the upper surface thereof, may be formed. At this time, the mounting hole 137 may be formed in such a size that the end portion of the pin tail area of the pin array assembly 200 is able to be inserted in one direction and a portion of the solder ball 190 is able to be inserted in the other direction.

Although the mounting hole 137 is illustrated as a rhombic through hole in this embodiment, the mounting hole may be formed in various shapes in which the solder ball can be stably seated. As an example, the shape of the mounting hole 137 may be variously changed to a circle, an oval, a polygon, etc. in consideration of the shape of the end portion of the pin tail area and the size of the solder ball, and the cross-sectional size of the through hole may also be changed. The size and shape of the through hole of the mounting hole 137 may be determined in consideration of high-speed signal transmission characteristics of the connector and stability when the connector is mounted on a board.

In addition, in the mounting hole 137, an upper part of the solder ball is inserted to fill a part of the cross section of the mounting hole 137, and the remaining part of the cross section of the mounting hole 137 that is not filled may function as an air passage. The air flow through the mounting hole 137 may function as a kind of dielectric to adjust the impedance of the connector.

The assembly insertion part 180 may be provided in the middle of the left side and in the middle of the right side of the base body frame 131 of the base mold 130 to correspond to the assembly fastening part 170 of the top mold 110.

The assembly insertion part 180 may include: a fastening hole 181 famed in the middle of the left side and in the middle of the right side of the base body frame 131; and a locking jaw 182 protruding from the inside of the fastening hole 181. At the upper end of the locking jaw 182, an inclined portion 183 may be provided to guide the assembly fastening part 170 to the fastening hole 181.

In addition, the assembly insertion part 180 may also be provided in the middle of the upper side and in the middle of the lower side of the base body frame 131 of the base mold 130 in correspondence with the assembly fastening part 170 of the top mold 110. Likewise in this case, the assembly insertion part 180 may include a fastening hole 185 formed in the middle of the upper side and in the middle of the lower side of the base body frame 131, and a locking jaw 186 protruding from the inside of the fastening hole 185, and at the upper end of the locking jaw 186, an inclined portion 187 may be provided to guide the assembly fastening part 170 to the fastening hole 185.

In this embodiment, it is illustrated and described that the assembly insertion part 180 is provided on each of the left side and right side and upper side and lower side of the base mold 130 corresponding to the embodiment of the top mold 110 discussed above. However, in correspondence with the deformation of the assembly fastening part 170, the arrangement number, arrangement position, shape, etc. of the assembly insertion part 180 may be selectively and variously modified.

Figure 13:
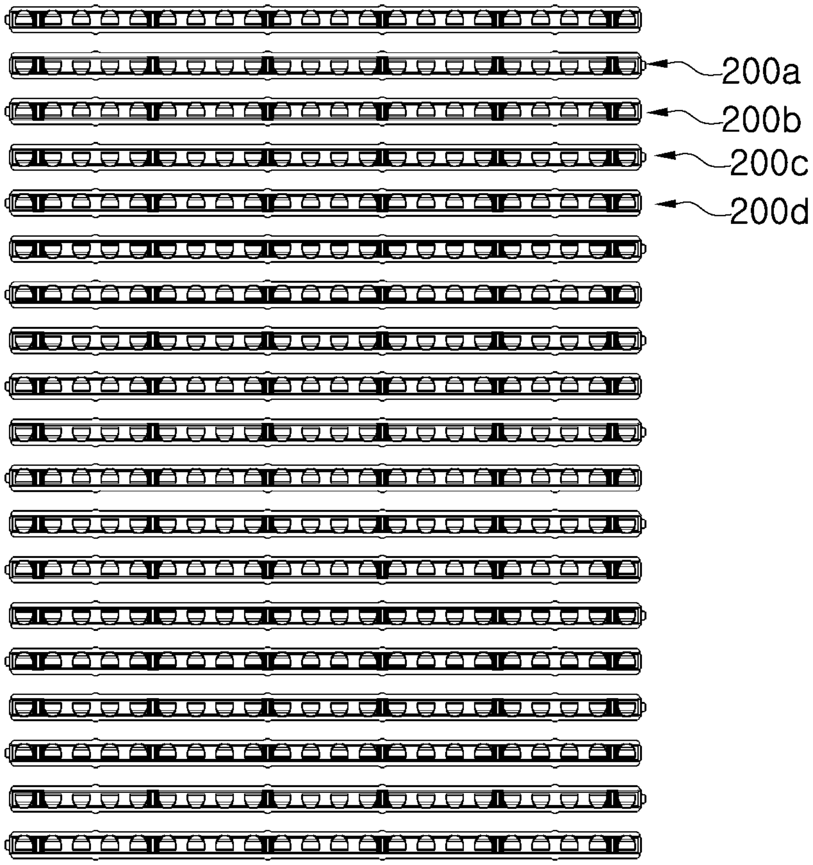
FIGS. 13 and 14 show an example in which a plurality of pin array assemblies are arranged in the longitudinal direction according to the directionality in the connector for high-speed signal transmission according to the present disclosure.
Figure 14:
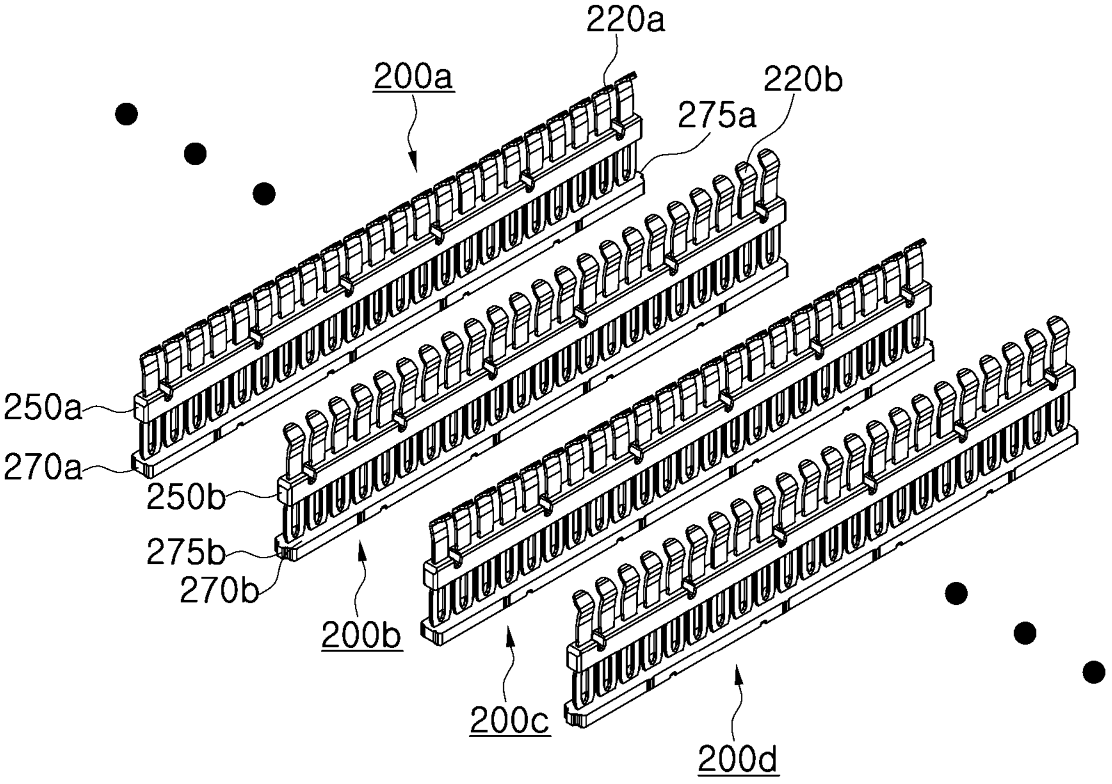

FIGS. 13 and 14 show an example in which a plurality of pin array assemblies are arranged in the longitudinal direction according to the directionality in the connector for high-speed signal transmission according to the present disclosure.

The pin array assembly 200 according to the present disclosure as described above may be applied as the plurality of pin array assemblies 200*a*, 200*b*, 200*c*, and 200*d* arranged in the longitudinal direction.

In the plurality of pin array assemblies 200*a* and 200*b*, each of the upper supports 250*a* and 250*b* is inserted and mounted in the mounting slot 112 of the top mold 110, and each of the lower supports 270*a* and 270*b* may be inserted and mounted in the mounting groove 135 of the base mold 130.

The plurality of pin array assemblies 200*a*, 200*b*, 200*c*, and 200*d* may be mounted while changing the insertion direction by alternating insertion directions. As described above in the embodiment of the top mold 110, the pin seating spaces 115*a* and 115*b* provided in the main partition wall 113 of the top mold 110 have insertion directionality of the pin array assemblies 200*a*, 200*b*, 200*c*, and 200*d*, and accordingly, the plurality of pin array assemblies 200*a*, 200*b*, 200*c*, and 200*d* may be inserted and mounted in the top mold 110 by matching the mounting insertion directions.

In addition, directional protrusions 275*a* and 275*b* for distinguishing directions are formed at one ends of the lower supports 270*a* and 270*b* of the pin array assemblies 200*a* and 200*b*. The plurality of pin array assemblies 200*a* and 200*b* may be inserted and mounted in the base mold 130 by aligning the directional protrusions 275*a* and 275*b* with the directional grooves 136 of the base mold 130.

The connector for high-speed signal transmission 100 according to the present disclosure may be manufactured more easily by applying the pin array assembly 200 according to the present disclosure. In this regard, FIGS. 15A to 15F show an example of manufacturing process of the connector for high-speed signal transmission according to the present disclosure.

Since FIG. 15A briefly shows and describes each configuration of the connector, specific details of each configuration will be described with reference to the above-described embodiments.

The manufacturing process of the connector for high-speed signal transmission 100 presented in FIG. 15 assumes that the pin array assembly 200 is prepared through the manufacturing process of the pin array assembly 200 shown in FIG. 5.

Figure 15A:
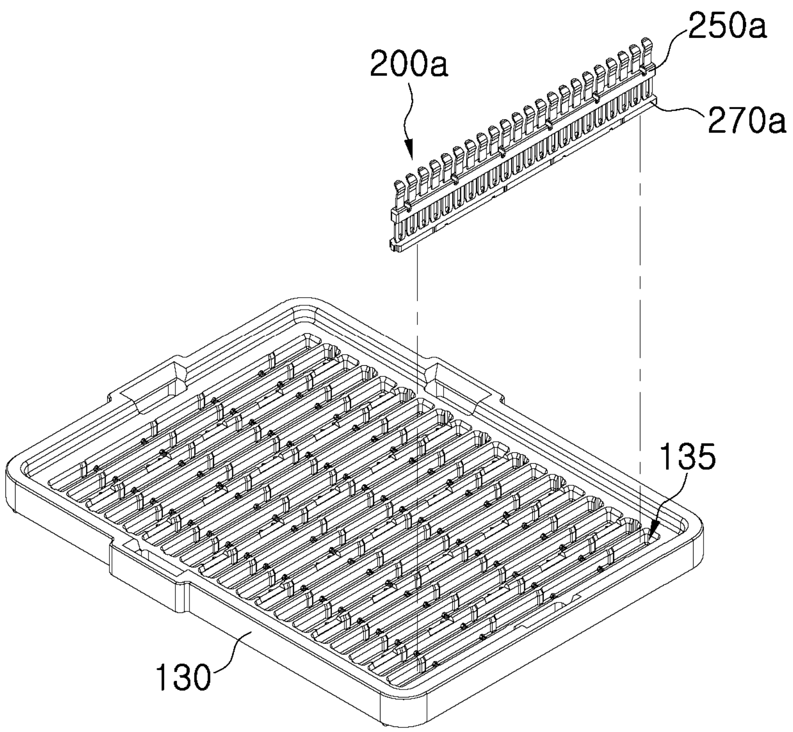
FIGS. 15A to 15F show an example of manufacturing process of the connector for high-speed signal transmission according to the present disclosure.

In a state in which the pin array assembly 200 is prepared, the pin array assembly 200*a* is inserted and mounted in the mounting groove 135 of the base mold 130 in one direction as shown in FIG. 15A. The lower support 270*a* of the pin array assembly 200*a* may be inserted and mounted into the mounting groove 135 of the base mold 130. At this time, the pin array assembly 200*a* is mounted on the base mold 130 by matching the directional protrusion formed on one side of the lower support 270*a* of the pin array assembly 200*a* to the directional groove formed on one side of the mounting groove of the base mold 130.

When the pin array assembly 200*a* is mounted on the base mold 130, the end portion of each pin of the pin array assembly 200 is inserted into the mounting hole 137 provided in the base bottom surface of the base mold 130.

Figure 15B:
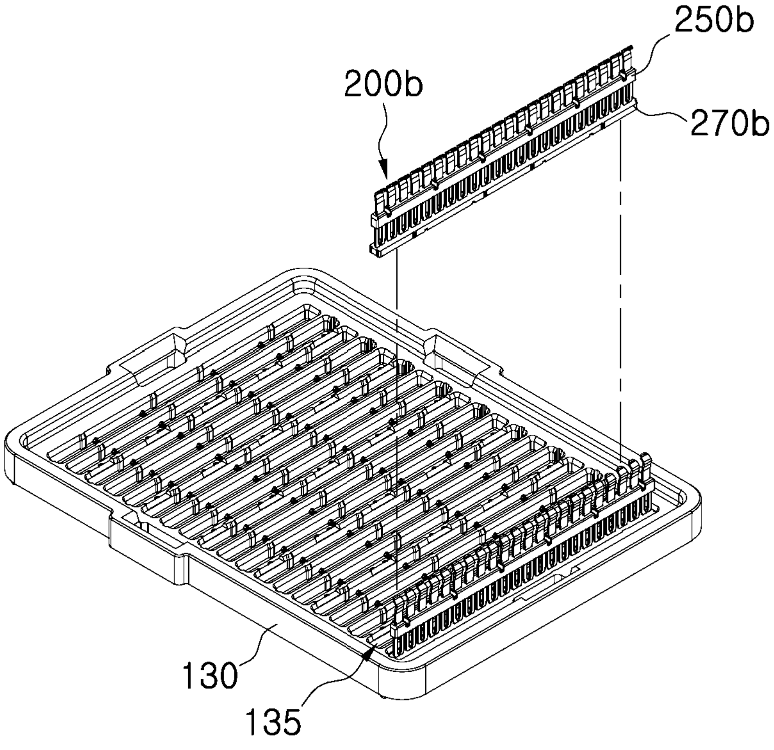

When the pin array assembly 200*a* is mounted in one direction, the next pin array assembly 200*b* is inserted and mounted in the mounting groove 135 of the base mold 130 in the other direction as shown in FIG. 15B. As in the case of pin array assembly 200*a*, the pin array assembly 200*b* is mounted on the base mold 130 by matching the directional protrusion formed on one side of the lower support 270*b* of the pin array assembly 200*b* to the directional groove famed on one side of the mounting groove of the base mold 130.

Figure 15C:
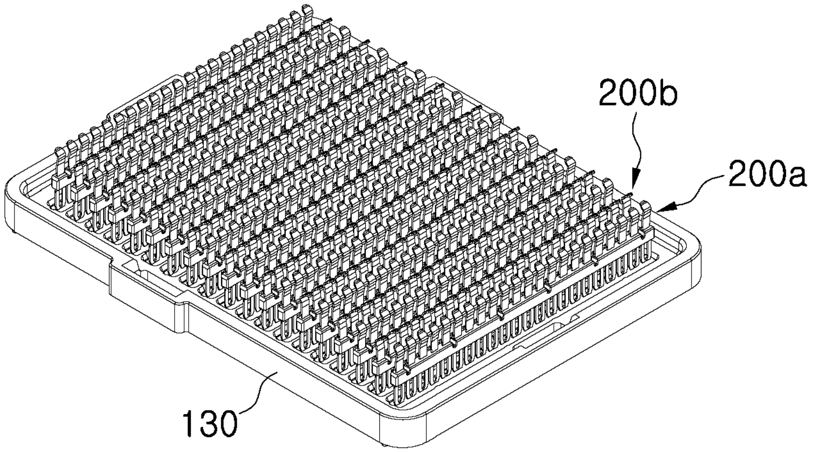

As such, by alternately inserting and mounting the plurality of pin array assemblies 200*a* and 200*b* into the plurality of mounting grooves 135 formed to be spaced apart in the longitudinal direction of the base mold 130 while changing the direction, the plurality of pin array assemblies 200*a* and 200*b* may be inserted and mounted on the base mold 130 as shown in FIG. 15C.

Figure 15D:
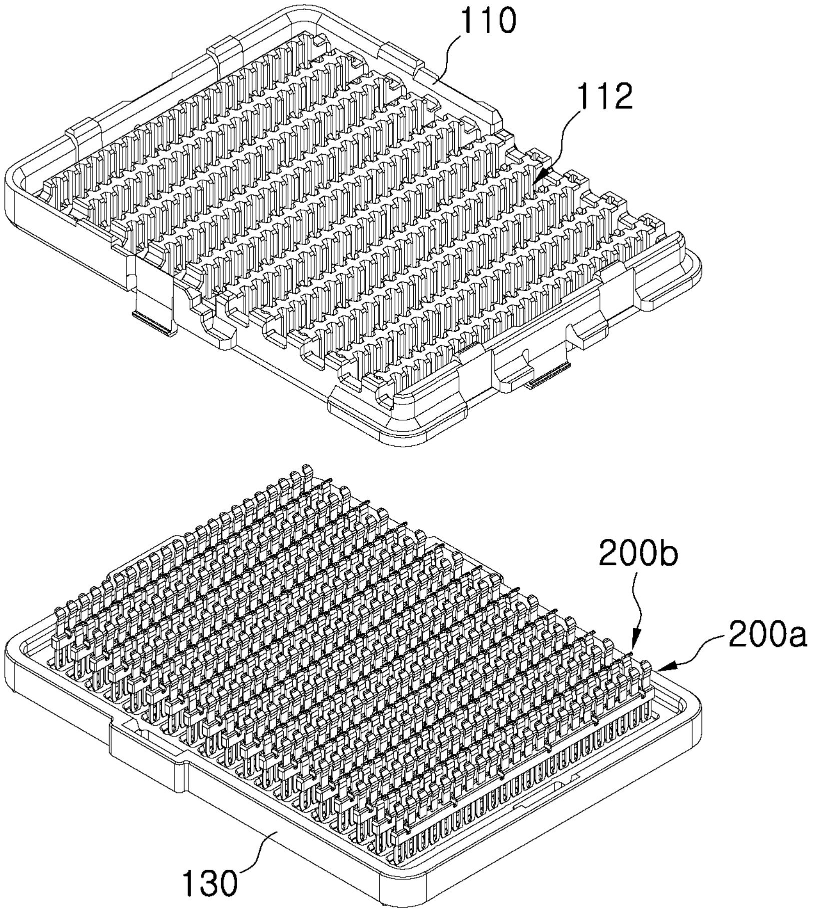

As shown in FIG. 15D, in a state in which the plurality of pin array assemblies 200*a* and 200*b* are inserted and mounted on the base mold 130, the top mold 110 is assembled thereon. The upper supports 270*a*, 270*b* of the plurality of pin array assemblies 200*a*, 200*b* are inserted and mounted into the mounting slots 112 of the top mold 110, and each pin head area of the pin array assemblies 200*a* and 200*b* is mounted to the pin seating space provided on each side of the main partition wall of the top mold 110 to be seated.

At this time, the assembly of the base mold 130 and the top mold 110 may be performed via the fastening means. To be specific, the top mold 110 may be assembled on the upper part of the base mold 130 by inserting and fastening the assembly fastening part of the top mold 110 in accordance with the assembly insertion part provided in the base mold 130.

Figure 15E:
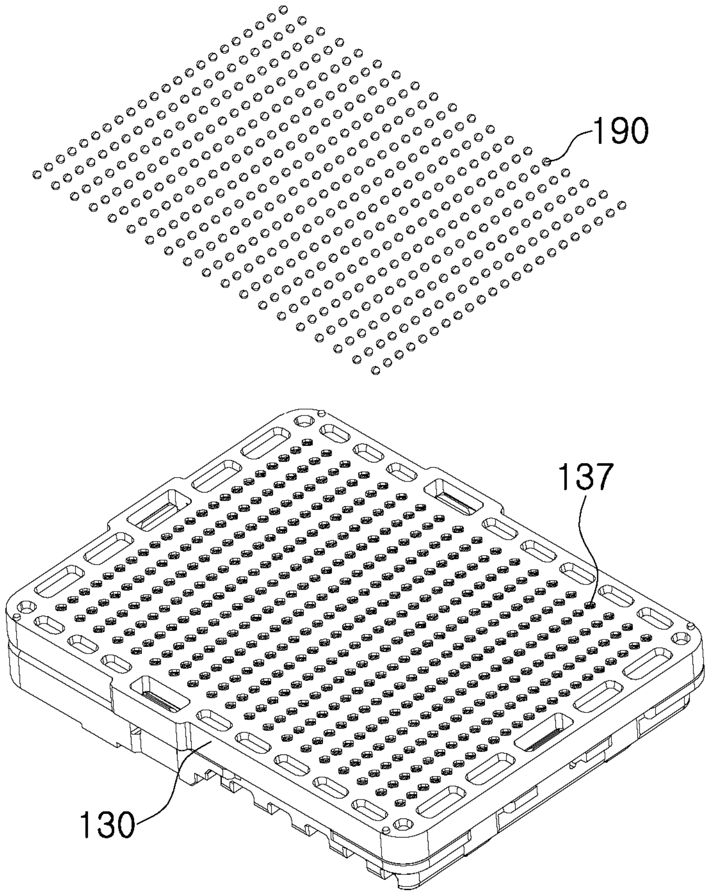

In a state in which the base mold 130 and the top mold 110 are stably assembled via the fastening means, by bonding the solder balls 190 to the lower surface of the mounting holes 137 of the base mold 130, the pin array assemblies 200*a* and 200*b* may be mounted via the solder balls 190 as shown in FIG. 15E.

Figure 15F:
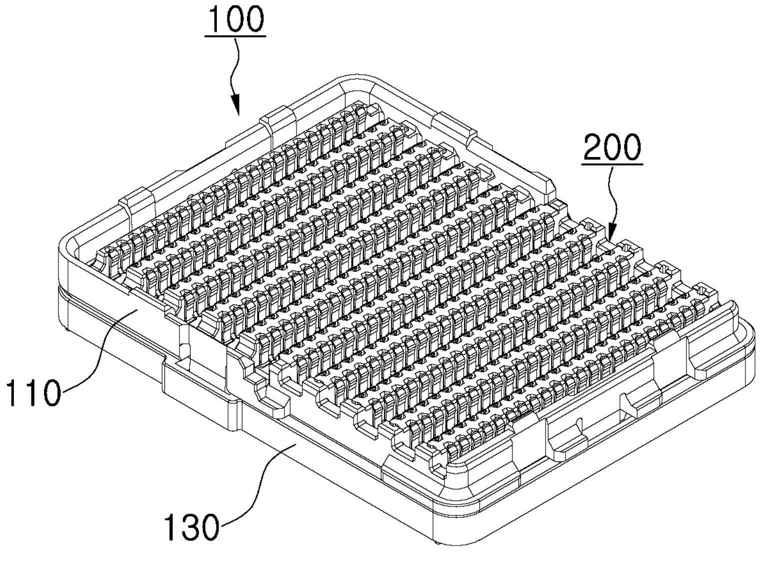

Through the above process, the connector 100 as shown in FIG. 15F may be completed.

Figure 16:
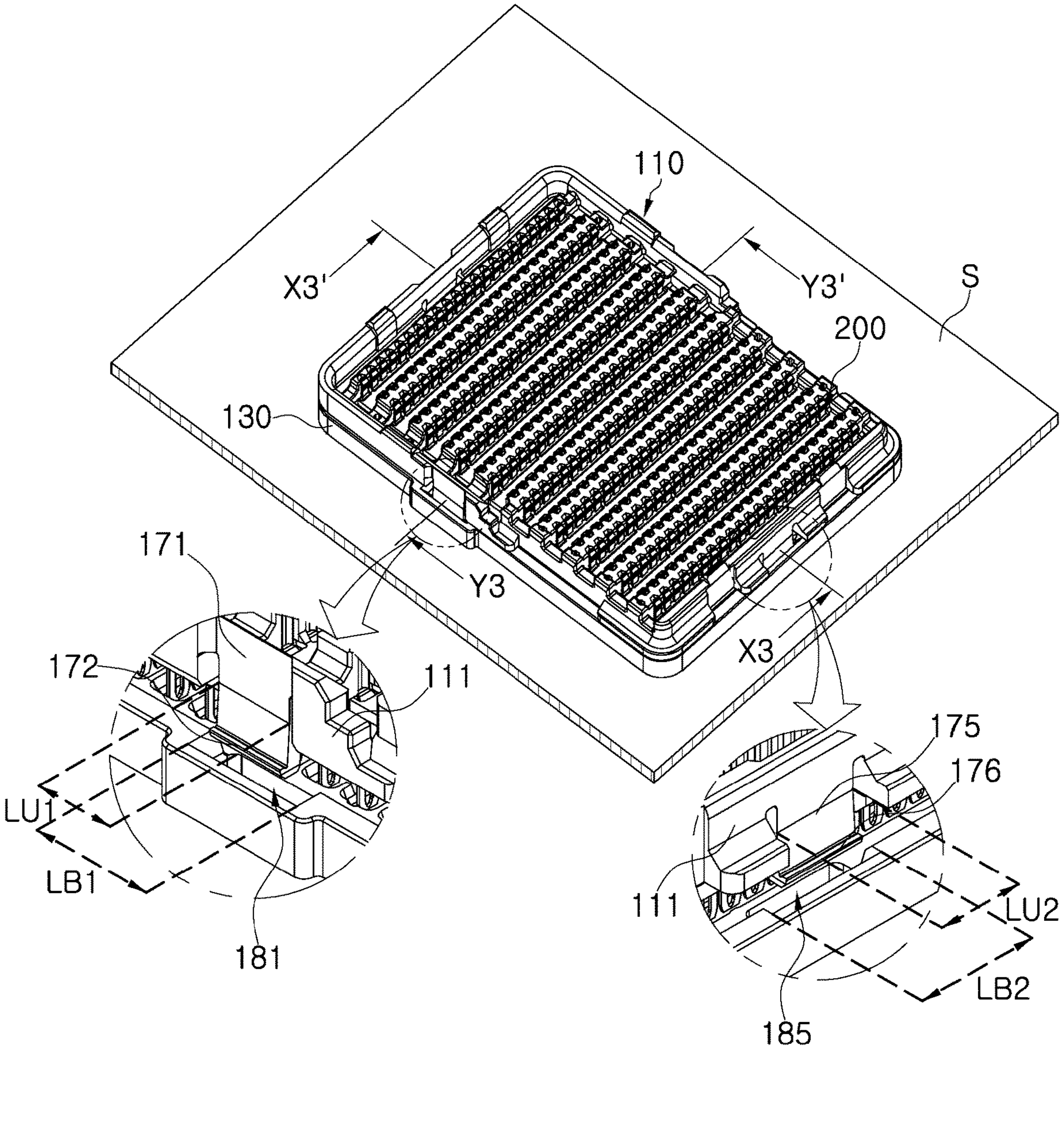
FIG. 16 is an example in which the connector for high-speed signal transmission according to the present disclosure is mounted on a board.
Figure 17:
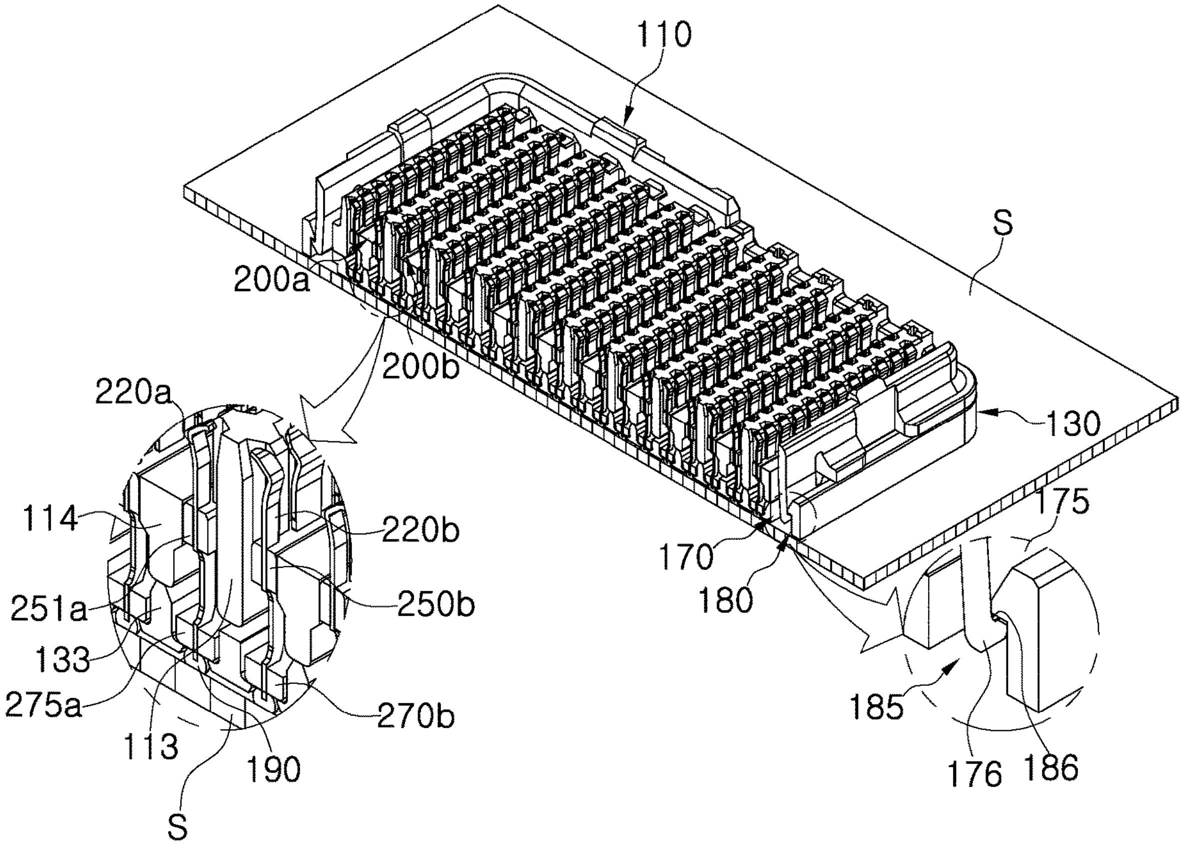
FIGS. 17 and 18 are cross-sectional views of the example of FIG. 16.
Figure 18:
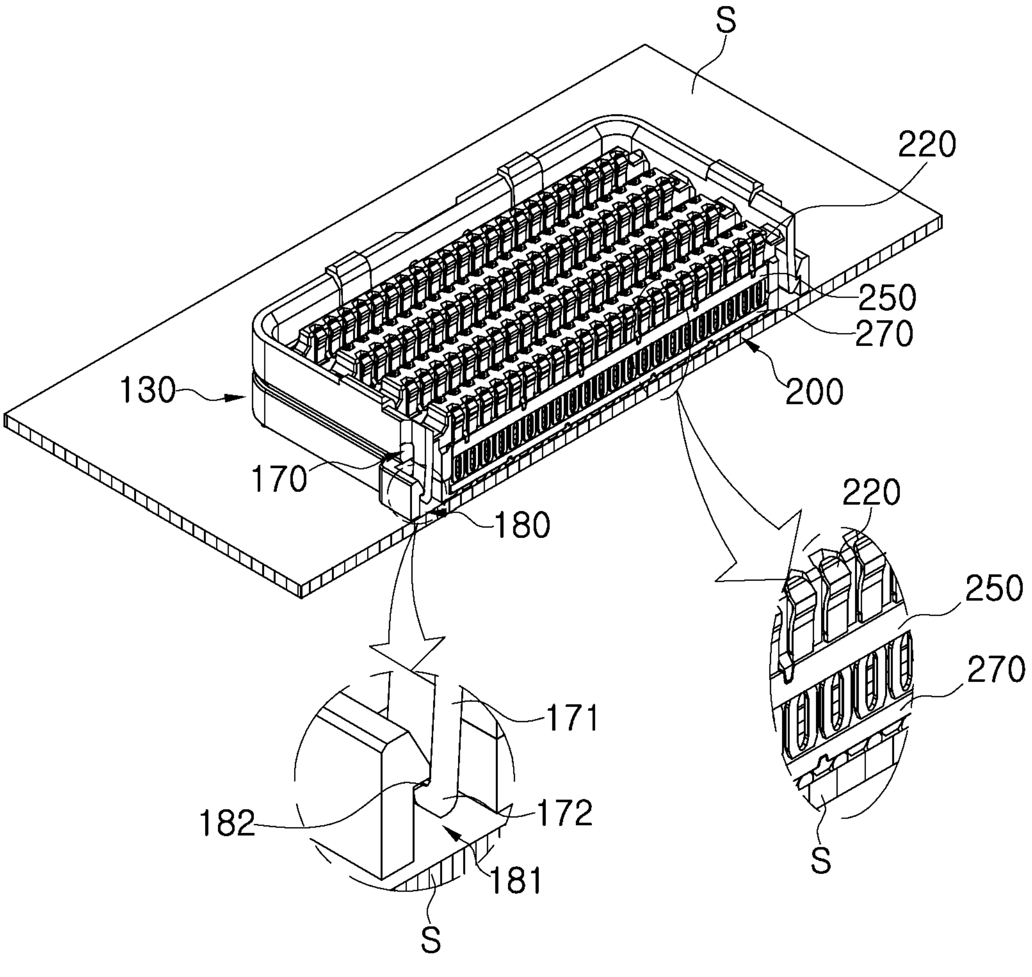

FIG. 16 is an example in which the connector for high-speed signal transmission according to the present disclosure is mounted on a board, and FIGS. 17 and 18 are cross-sectional views of the example of FIG. 16.

FIG. 17 is a cut-away view of the example of FIG. 16 taken along the X3-X3' direction, and FIG. 18 is a cut-away view of the example of FIG. 16 taken along the Y3-Y3' direction.

In describing FIGS. 16 to 18, reference will be made to the aforementioned embodiment of each configuration of the connector.

The base mold 130 and the top mold 110 are assembled to correspond to each other, and the assembly of the base mold 130 and the top mold 110 may be performed via the fastening means. To be specific, the assembly fastening part 170 of the top mold 110 may be inserted and fastened in accordance with the assembly insertion part provided in the base mold 130.

The top mold 110 may be mounted and assembled on the upper part of the base mold 130 as the fastening protrusions 172 and 176 formed at the ends of the fastening support legs 171 and 175 of the assembly fastening part 170 engage with the locking jaws 182 and 186 formed in the fastening holes 181 and 185 of the assembly insertion part 180. As the fastening protrusions 172 and 176 are engaged with the locking jaws 182 and 186 and are caught, the top mold 110 may be fixed so as not to be separated from the base mold 130.

Since the space of each of the fastening holes 181 and 185 of the assembly insertion part 180 is provided wider than the cross-sectional length of each of the fastening support legs 171 and 175 of the assembly fastening part 170, the assembly fastening part 170 may be slightly movable in the horizontal direction in the assembly insertion part 180.

That is, the space length LB1 of the fastening hole 181 formed in the middle of the left and right sides of the base body frame 131 of the assembly insertion part 180 may be formed wider than the width length LU1 of the fastening support leg 171 formed at the middle of the left and right sides of the top body frame 111 of the assembly fastening part 170 by a predetermined value. The ratio of the difference between the space length LB1 of the fastening hole 181 and the width length LU1 of the fastening support leg 171 may be adjusted as needed.

In addition, the space length LB2 of the fastening hole 185 formed in the middle of the upper and lower sides of the base body frame 131 of the assembly insertion part 180 may be formed wider than the width length LU2 of the fastening support leg 175 formed at the middle of the upper and lower sides of the top body frame 111 of the assembly fastening part 170 by a predetermined value. As described above, the ratio of the difference between the space length LB2 of the fastening hole 185 and the width length LU2 of the fastening support leg 175 may be adjusted as needed.

As described above, the assembly fastening part 170 in the assembly insertion part 180 is able to move slightly in the left-right direction and the front-rear direction, and thus, when an external force is applied to the connector 100 due to various factors such as coupling with a counterpart connector, the top mold 110 may relatively move slightly in the left-right and front-rear directions with respect to the base mold 130 according to the external force while the base mold 130 is maintained fixed on the substrate S.

Moreover, as the top mold 110 moves in the left-right direction and the front-rear direction with respect to the base mold 130, the pins of the pin array assembly 150 may also be bent and deformed.

Figure 19:
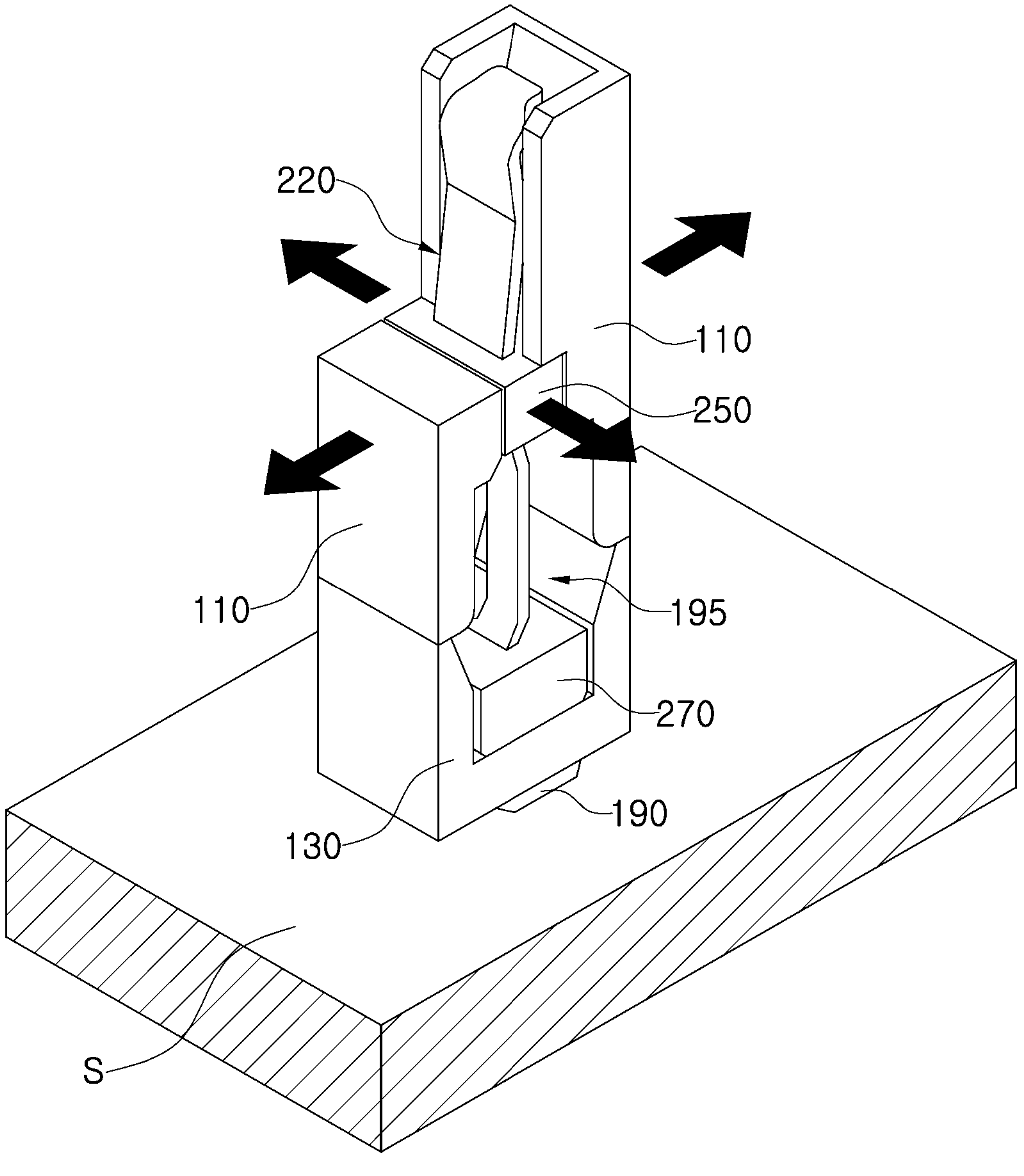
FIG. 19 is an example of a structure for relieving stress of the pin in the connector for high-speed signal transmission according to the present disclosure.
Figure 20A:
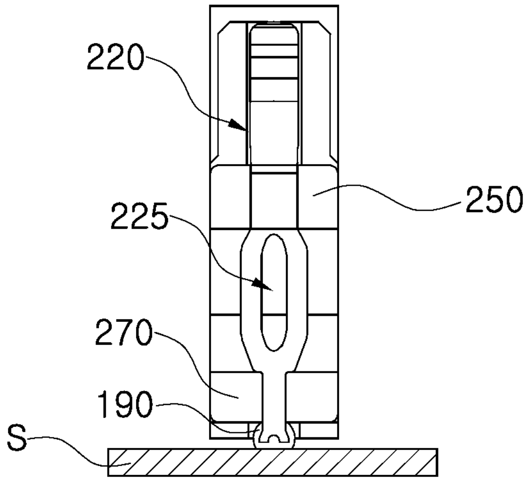
FIGS. 20A and 20B a cross-sectional view viewed from the front and a cross-sectional view viewed from the side of the example of FIG. 19.
Figure 20B:
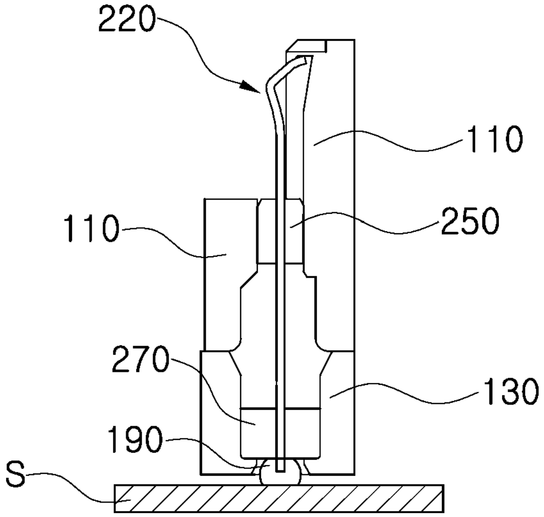

A structure for relieving stress of a pin will be described in more detail with reference to FIGS. 19, 20A, and 20B together.

The middle portion of the pin 220 may be supported by the top mold 110, and the lower end of the pin 220 may be supported by the base mold 130. The top mold 110 and the base mold 130 may directly support the pin 220. However, as shown in this embodiment, the middle portion of the pin 220 may be supported as the upper support 250 disposed on the middle portion of the pin 220 is inserted and mounted in the mounting slot 112 of the top mold 110, while the lower end of the pin 220 may be supported as the lower support 270 disposed at the lower end of the pin 220 is inserted and mounted in the mounting groove 135 of the base mold 130.

The lower end of the pin 220 is mounted on the substrate S via the base mold 130, and the pins 220 may be mounted and fixed on the substrate S together with the base mold 130 by a surface mounting process (SMT) using solder balls 190 or the like.

Upon mounting pins on a connector, as a mounting material such as solder or a solder ball rides up the pin, the problem of change in impedance of the connector pin and a contact defect with a counterpart pin may occur.

However, in the present disclosure, as the lower end of the pin 220 is insert-molded and sealed by the lower support 270, when the pin 220 is mounted, the rise of the mounting material on the pin may be primarily prevented by the lower support 270.

In addition, as the middle portion of the pin 220 is insert-molded and sealed by the upper support 250, when the pin 220 is mounted, the rise of the mounting material on the pin may be secondarily prevented by the upper support 250.

As described above, by inserting the pin 220 to form the lower support 270 and the upper support 250 by a molding method, the corresponding areas are sealed, so that the rise of the mounting material may be effectively prevented. This makes it possible to ensure the high-speed signal transmission characteristics of the connector.

In addition, since the lower end of the pin 220 is supported by the base mold 130 and the base mold 130 is fixedly mounted to the substrate S, the lower end of the pin 220 may be stably maintained in a fixed state by the base mold 130.

The top mold 110 assembled on the upper part of the base mold 130 may be relatively movable via the fastening means, and the middle portion of the pin 220 may be supported by the top mold 110.

When an external force is applied to the connector 100 due to various factors such as coupling with a counterpart connector, the top mold 110 may relatively move slightly in the left-right and front-rear directions with respect to the base mold 130 according to the external force.

As the top mold 110 moves, the middle portion and upper end of the pin 220 supported by the top mold 110 are moved together with the top mold 110, while the lower end of the pin 220 supported by the base mold 130 may be maintained in a fixed state since the base mold 130 is maintained in a fixedly mounted state on the substrate S.

As the top mold 110 moves relative to the base mold 130, the body area of the pin 220 positioned between the upper support 250 and the lower support 270 may be bent and deformed according to the moving direction.

A cavity 195, which is an empty space, may be provided between a portion where the upper support 250 is mounted in the top mold 110 and a portion where the lower support 270 is mounted in the base mold 130 to facilitate bending deformation of the pin 220 body area.

The body area 224 of the pin 220 is formed with the through hole 225, so that it can be bent and deformed in the width direction. Since the body area 224 of the pin 220 is located in the cavity 195, which is an empty space, there is no physical constraint during bending deformation in the left-right direction, which is the width direction, and thus, it is possible to effectively relieve stress caused by external force by means of bending deformation.

As such, as a portion of the pin 220 is bent and deformed due to the relative movement of the top mold 110 caused by the external force, the stress applied by the external force is resolved, so that the external force does not affect the lower end of the pin 220.

That is, the top mold 110 and the base mold 130 are separated, and as the top mold 110 moves relatively by the external force and the body area of the pin 220 is bent and deformed accordingly to make the external force disappear while the base mold 130 maintains a fixed state, the external force does not reach the lower end of the pin 220, and thus, it is possible to stably maintain the contact portion of the substrate S of the pin 220.

An operation relationship of relieving the stress of a pin in a state in which the connector according to the present disclosure is mounted on a board will be described in more detail with reference to FIGS. 21A to 22B.

FIGS. 21A to 22B are cross-sectional views showing the relationship of stress relief operation of pins in the example of FIG. 17.

Figure 21A:
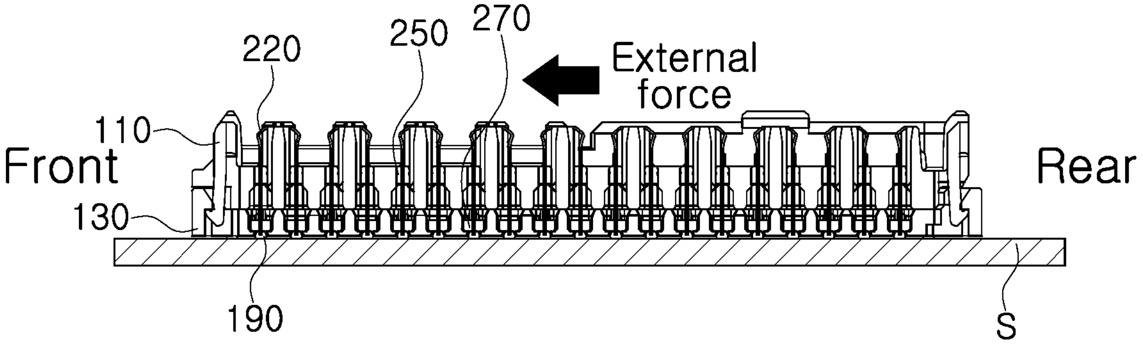
FIGS. 21A, 21B, 22A, and 22B are cross-sectional views showing the relationship of stress relief operation of pins in the connector for high-speed signal transmission according to the present disclosure.
Figure 21B:
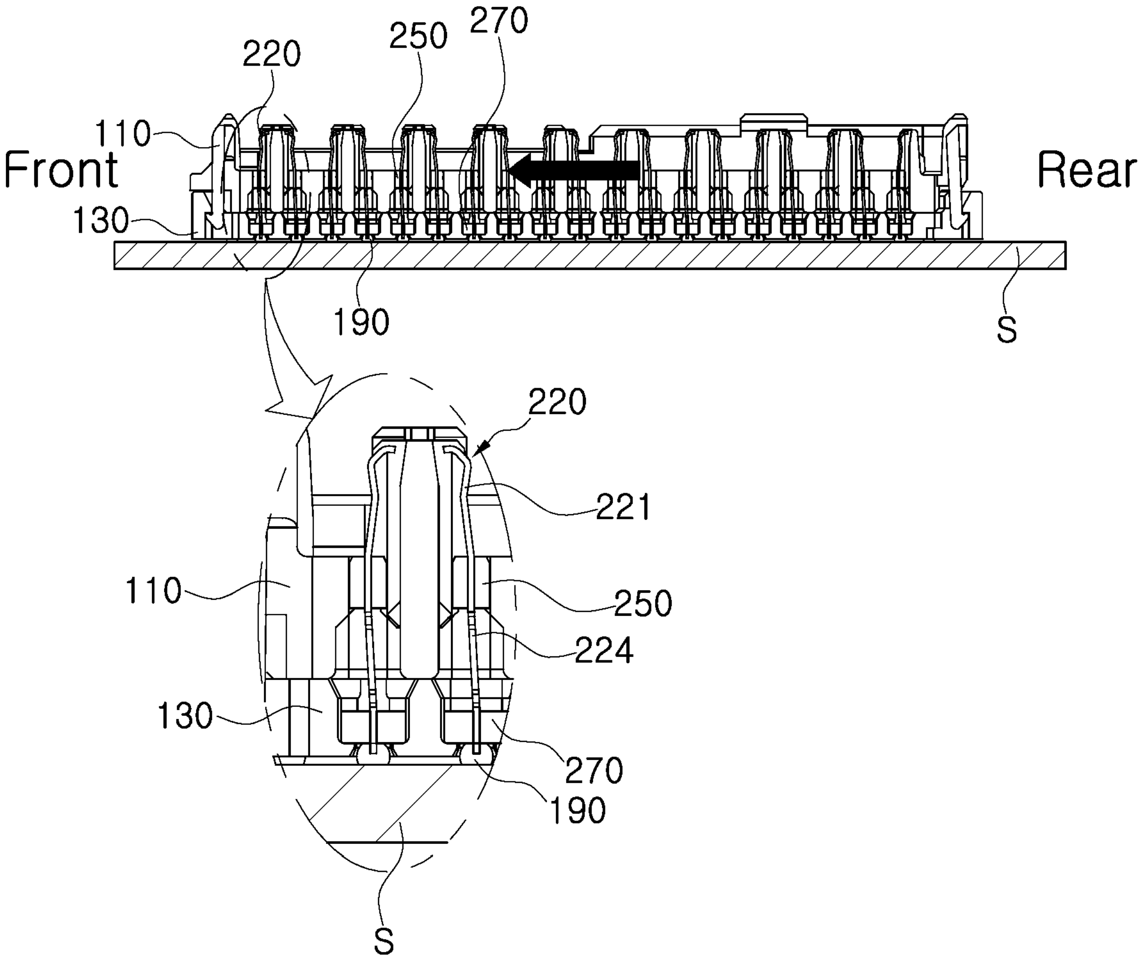

When an external force directed from the rear to the front is applied to the connector 100 while the connector 100 according to the present disclosure is mounted on the substrate S as shown in FIG. 21A, the top mold 110 may be moved from the rear to the front by the external force while the base mold 130 remains fixed to the substrate S as shown in FIG. 21B.

As the top mold 110 moves, the upper support 250 mounted in the top mold 110 moves together, and thus the head area 221 of the pin 220 is also moved. At this time, since the base mold 130 is fixed to the substrate S and does not move, the lower support 270 mounted on the base mold 130 also maintains a fixed state.

That is, as the lower support 270 mounted on the base mold 130 is fixed, and the upper support 250 mounted in the top mold 110 is relatively moved forward, a bending deformation occurs in the body area 224 of the pin 220 positioned therebetween.

The thickness direction of the pin 220 has an elastic force capable of bending deformation at a certain level, and the bending deformation occurs in the body area 224 of the pin 220 as the upper side of the body area 224 of the pin 220 is pushed from the rear to the front, and the lower side of the body area 224 of the pin 220 is maintained in a fixed state.

When an external force directed toward the front or rear is applied to the connector 100 as described above, as the body area 224 of the pin 220 is bent and deformed forward or backward, the stress caused by the external force is dissipated, so that the external force does not affect the solder balls 190 at the board contact portion of the pin 220, thereby stably maintaining the board contact portion. In addition, the effect of transferring an external force to the substrate S through the pins 220 may be eliminated.

Figure 22A:
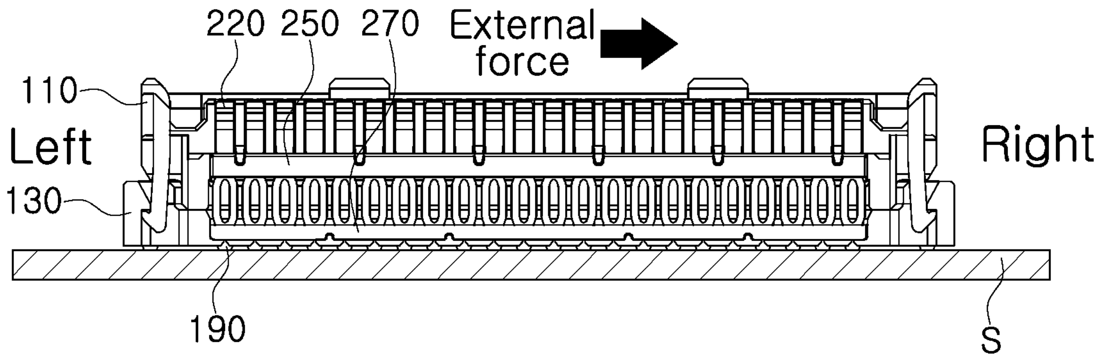
Figure 22B:
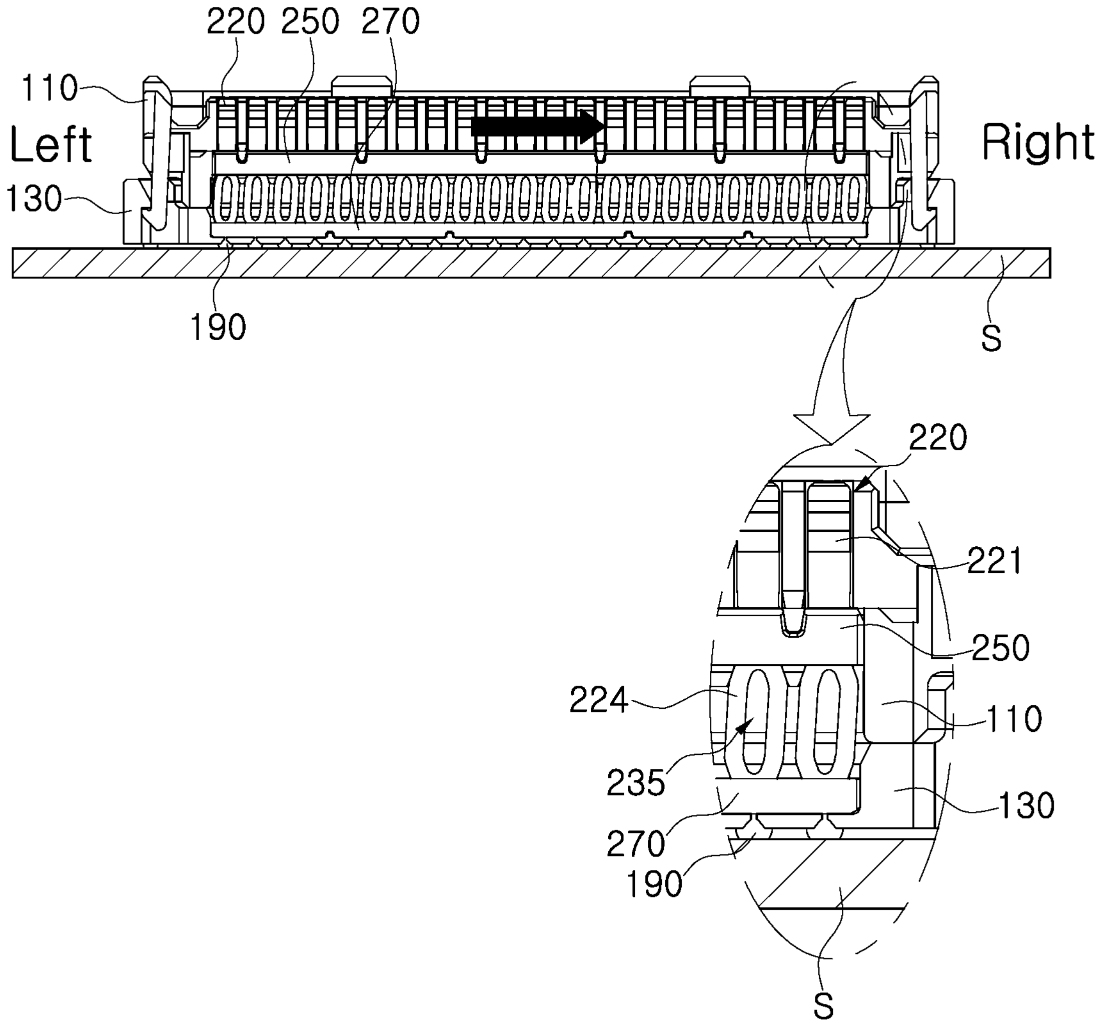

FIGS. 22A and 22B are cross-sectional views showing the relationship of stress relief operation of pins in the example of FIG. 18.

When an external force directed from the left to the right is applied to the connector 100 while the connector 100 according to the present disclosure is mounted on the substrate S as shown in FIG. 22A, the top mold 110 may be moved from the left to the right by the external force while the base mold 130 remains fixed to the substrate S as shown in FIG. 22B.

As the top mold 110 moves, the upper support 250 mounted in the top mold 110 moves together, and thus the head area 221 of the pin 220 is also moved. At this time, since the base mold 130 is fixed to the substrate S and does not move, the lower support 270 mounted on the base mold 130 also maintains a fixed state.

That is, as the lower support 270 mounted on the base mold 130 is fixed, and the upper support 250 mounted in the top mold 110 is relatively moved forward, a bending deformation occurs in the body area 224 of the pin 220 positioned therebetween.

The through hole 235 is formed in the body area 224 of the pin 220 to adjust the width of the body area 224 of the pin 220, so that bending deformation in the width direction may be possible. The bending deformation occurs in the body area 224 of the pin 220 as the upper side of the body area 224 of the pin 220 is pushed from the left to the right, and the lower side of the body area 224 of the pin 220 is maintained in a fixed state.

When an external force directed toward the left or right is applied to the connector 100 as described above, as the body area 224 of the pin 220 is bent and deformed to the left or right, the stress caused by the external force is dissipated, so that the external force does not affect the solder balls 190 at the board contact portion of the pin 220, thereby stably maintaining the board contact portion. In addition, the effect of transferring an external force to the substrate S through the pins 220 may be eliminated.

The connector for high-speed signal transmission 100 according to the present disclosure is described as a hermaphroditic connector in which pins are capable of selectively pertaining a function of a receptacle or a plug. However, this is an embodiment, and the present disclosure is not limited thereto. The connector of the present disclosure may be a receptacle connector in which the pins are configured as receptacle pins or a plug connector in which the pins are configured as plug pins.

With the present disclosure as described above, it is possible to provide a connector capable of ensuring reliability for high-speed signal transmission characteristics and mounting stability on a board.

In particular, since pitches of connector pins may be maintained precisely by supporting a pin array with an upper support and a lower support using insert injection molding method, it is possible to solve the problem of mismatching due to pin pitch error when coupling connectors.

In addition, in the case of high-speed signal transmission connectors, a connector pin is easily bent or deformed even by a weak external force due to the reduced size and thickness of the pin, leading to a problem of pins being deformed or damaged when the pins are mounted on a connector body. This problem may be solved by means of a pin array assembly.

Moreover, by applying the insert injection molding method to seal the lower portion and the middle portion of the pin array, it is possible to solve the problem of impedance change of the connector pin and a contact defect with a counterpart pin due to the mounting material riding up the pin.

Furthermore, by removing the external force applied to the connector stemming from various factors such as coupling with the mating connector, the state of the board contact may be stably maintained.

In addition, the board contact area of the connector may be reliably protected, improving the reliability of the signal transmission characteristics of high-speed signal transmission connectors that require high data rates of 28 Gbps, 56 Gbps, or 112 Gbps or more.

Furthermore, it is possible to protect sensitive electronic components mounted on the board from external force by blocking the external force from being transferred to the board via the pins of the connector.

The above description is merely illustrative of the technical idea of the present disclosure, and various modifications and variations may be made by those skilled in the art to which the present disclosure pertains without departing from the essential characteristics of the present disclosure. Therefore, the embodiments described in the present disclosure are not intended to limit the technical spirit of the present disclosure, but to explain, and the technical spirit of the present disclosure is not limited by these embodiments. The protection scope of the present disclosure should be construed by the following claims, and all technical ideas within the scope equivalent thereto should be construed as being included in the scope of the present disclosure.

What is claimed is:

1. A pin array assembly, comprising:

a pin array including a plurality of pins arranged to be spaced apart;

a lower support in which a lower end of the pin array is insert-molded and sealed, wherein the lower support is configured to support the lower end of the pin array while maintaining a set pitch of the pin array; and an upper support, separated from the lower support, in which a middle portion of the pin array is insert-molded and sealed, and is configured to support the middle portion of the pin array while maintaining the set pitch of the pin array, wherein the plurality of pins include a first pin including a deformable body area having a through hole at a center of the deformable body area, and wherein the deformable body area, in response to a relative movement of the lower support and the upper support, is deformable in a width direction of the deformable body area in a space between the middle portion of the pin array and the lower end of the pin array.

2. The pin array assembly of claim 1, wherein the first pin of the plurality of pins further comprises:

a head area provided with a curved portion that is bent to protrude in one direction and matches a pin of a mating connector; and a tail area, wherein a portion of the head area, a portion of the deformable body area, or the portions of the head area and the deformable body area are insert-molded in the upper support and supported, and wherein a portion of the deformable body area, a portion of the tail area, or the portions of the deformable body area and the tail area are insert-molded in the lower support and supported.

3. The pin array assembly of claim 2, wherein the tail area of the first pin includes:

a mounting portion recessed into a semicircle or polygon at an end thereof.

4. The pin array assembly of claim 2, wherein the tail area of the first pin includes:

a mounting portion formed in a bending shape bent in a lateral direction at an end thereof.

5. The pin array assembly of claim 1, wherein the pin array has a directionality to be coupled with pins of a mating connector, and wherein a directional groove is formed at one end of the lower support to correspond to the directionality.

6. A connector for high-speed signal transmission, the connector comprising:

a pin array assembly, wherein the pin array assembly includes:

a pin array including a plurality of pins, the plurality of pins including a first pin including a body area in which a through hole is formed, wherein the plurality of pins are arranged to be spaced apart from each other;

a lower support in which a lower end of the pin array is insert-molded and sealed, wherein the lower support is configured to support the lower end of the pin array while maintaining a set pitch of the pin array; and an upper support, separated from the lower support, in which a middle portion of the pin array is insert-molded and sealed, and is configured to support the middle portion of the pin array while maintaining the set pitch of the pin array;

a base mold mounted and fixed on a substrate and in which the lower support is inserted and supported so that an end of the first pin is mounted and fixed to the substrate; and a top mold in which the upper support is inserted and supported, wherein the body area of the first pin is a deformable body area, wherein the through hole passes through a center of the deformable body area, and wherein the deformable body area, in response to a relative movement of the lower support and the upper support, is deformable in a width direction of the deformable body area in a space between the middle portion of the pin array and the lower end of the pin array.

7. The connector for high-speed signal transmission of claim 6, wherein when the connector is mounted on the substrate, a rise of a mounting material along the first pin is primarily prevented by the lower support and is secondarily prevented by the upper support.

8. The connector for high-speed signal transmission of claim 6, further comprising:

a fastening means configured to support a relative movement of the top mold with respect to the base mold, and to assemble the top mold on top of the base mold, wherein an end contact portion of the first pin mounted on the substrate via the base mold is fixed and maintained, and when an external force is applied, the body area of the first pin is bent and deformed according to the relative movement of the top mold with respect to the base mold via the fastening means.

9. The connector for high-speed signal transmission of claim 8, wherein the fastening means comprises:

an assembly fastening part formed to protrude in a vertical direction from a side of one of the base mold and the top mold; and an assembly insertion part formed to be wider than a cross-sectional length of the assembly fastening part on a side of a remaining one, so that the assembly fastening part is inserted and fastened, and wherein the base mold and the top mold are assembled by a fastening of the assembly fastening part and the assembly insertion part, and when the external force is applied, the assembly fastening part is moved in a cross-sectional length direction in the assembly insertion part, so that the relative movement of the top mold is made.

10. The connector for high-speed signal transmission of claim 8, wherein the top mold comprises:

a top body frame;

a plurality of main partition walls provided to be spaced apart in a longitudinal direction inside the top body frame;

a plurality of sub partition walls spaced apart in the longitudinal direction inside the top body frame and provided between the plurality of main partition walls; and a mounting slot provided by the plurality of main partition walls and the plurality of sub partition walls and into which the upper support of the pin array assembly is inserted and mounted.

11. The connector for high-speed signal transmission of claim 10, wherein the top mold further comprises:

a pin seating space provided in the plurality of main partition walls so that a head area of the first pin of the pin array assembly is inserted and seated.

12. The connector for high-speed signal transmission of claim 11, wherein the pin seating space is provided on each side of the plurality of main partition walls.

13. The connector for high-speed signal transmission of claim 11, wherein the pin seating space has one side open so that a left-right movement of the head area of the first pin is restricted while a front-rear movement is possible.

14. The connector for high-speed signal transmission of claim 8, further comprising:

a cavity formed as a space in which the body area of the first pin is positioned between the lower support mounted on the base mold and the upper support mounted in the top mold.

15. The connector for high-speed signal transmission of claim 8, wherein the connector is a hermaphroditic connector in which the first pin of the pin array assembly is capable of selectively performing a function of a receptacle or a plug.

16. The connector for high-speed signal transmission of claim 8, wherein the connector is a receptacle connector or a plug connector in which the first pin of the pin array assembly performs either a function of a receptacle or a plug.

17. The connector for high-speed signal transmission of claim 6, wherein the base mold comprises:

a base body frame;

a base bottom surface formed on a lower part of the base body frame;

a plurality of mounting partition walls spaced apart in a longitudinal direction inside the base body frame and provided on an upper surface of the base bottom surface; and a mounting groove provided between the plurality of mounting partition walls and into which the lower support of the pin array assembly is inserted and mounted.

18. The connector for high-speed signal transmission of claim 17, wherein the base mold further comprises:

a mounting hole formed as a through hole in the base bottom surface, and in which a solder ball is seated in a downward direction and the end of the first pin of the pin array assembly is inserted and mounted in an upward direction.

19. The connector for high-speed signal transmission of claim 18, wherein in the mounting hole, a mounting part of the pin array assembly is inserted and mounted in the upward direction, a portion of an upper part of the solder ball is joined in the downward direction to fill a part of a cross section thereof, and an air passage is formed at a remaining part of the cross section.

* * * * *